(12) United States Patent
Kim et al.

(10) Patent No.: US 11,966,010 B2
(45) Date of Patent: Apr. 23, 2024

(54) ELECTRONIC DEVICE INCLUDING CAMERA MODULE

(71) Applicant: Samsung Electronics Co., Ltd., Suwon-si (KR)

(72) Inventors: Seungyong Kim, Suwon-si (KR); Sangyong Jeon, Suwon-si (KR); Jeongyeol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 588 days.

(21) Appl. No.: 17/097,670

(22) Filed: Nov. 13, 2020

(65) Prior Publication Data

US 2021/0149157 A1    May 20, 2021

(30) Foreign Application Priority Data

Nov. 20, 2019  (KR) .................. 10-2019-0149787
Feb. 10, 2020  (KR) .................. 10-2020-0015353

(51) Int. Cl.
  *G02B 13/00*  (2006.01)
  *G02B 1/04*   (2006.01)
  (Continued)

(52) U.S. Cl.
  CPC ......... *G02B 13/0015* (2013.01); *G02B 1/041* (2013.01); *G02B 1/11* (2013.01);
  (Continued)

(58) Field of Classification Search
  CPC .. F02B 1/04; G02B 1/041; G02B 1/11; G02B 13/001; G02B 13/0015; G02B 27/0018;
  (Continued)

(56) References Cited

U.S. PATENT DOCUMENTS 10,228,493 B2   3/2019  Kawasaki
2013/0301140 A1  11/2013  Matsuno et al.
(Continued)

FOREIGN PATENT DOCUMENTS

EP    3232237 A1     10/2017
JP    2005-128351 A   5/2005
(Continued)

OTHER PUBLICATIONS

International Search Report dated Feb. 18, 2021, issued in International Application No. PCT/KR2020/015957.
(Continued)

*Primary Examiner* — Joseph P Martinez
*Assistant Examiner* — Vipin Patel
(74) *Attorney, Agent, or Firm* — Jefferson IP Law, LLP

(57)  ABSTRACT

An electronic device is provided. The electronic device includes a housing, and a camera module disposed in an inner space of the housing, wherein the camera module includes an image sensor and a plurality of lenses aligned with the image sensor, and wherein at least one of the plurality of lenses includes a first area formed to transfer at least a part of an external light to the image sensor and a second area including a light absorbing layer formed to absorb the at least a part of the external light and to penetrate from an outer surface of the lens into an inner space with a predetermined depth.

20 Claims, 26 Drawing Sheets

(51) Int. Cl.
  *G02B 1/11* (2015.01)
  *G02B 5/00* (2006.01)
  *H04N 23/51* (2023.01)
  *H04N 23/57* (2023.01)
(52) U.S. Cl.
  CPC ............. *G02B 5/003* (2013.01); *H04N 23/51* (2023.01); *H04N 23/57* (2023.01)
(58) Field of Classification Search
  CPC ........ G02B 5/003; G02B 5/005; H04N 23/51; H04N 23/55; H04N 23/57
  See application file for complete search history.

(56) References Cited

U.S. PATENT DOCUMENTS

| | | | |
|---|---|---|---|
| 2015/0103226 A1 | 4/2015 | Takahashi et al. | |
| 2016/0011415 A1 | 1/2016 | Takada | |
| 2016/0178805 A1* | 6/2016 | Kang | G02B 7/022 427/162 |
| 2016/0349504 A1 | 12/2016 | Kim et al. | |
| 2017/0176649 A1 | 6/2017 | Chang | |
| 2017/0322394 A1 | 11/2017 | Chou et al. | |
| 2018/0031745 A1 | 2/2018 | Kim et al. | |
| 2018/0059298 A1 | 3/2018 | Lee et al. | |
| 2019/0049737 A1* | 2/2019 | Terai | G02B 27/0955 |
| 2019/0317253 A1* | 10/2019 | Huang | G02B 13/0045 |
| 2020/0012081 A1 | 1/2020 | Komai | |
| 2021/0006733 A1 | 1/2021 | Lee | |

FOREIGN PATENT DOCUMENTS

| | | |
|---|---|---|
| JP | 2016-080865 A | 5/2016 |
| WO | 2018/168526 A1 | 9/2018 |
| WO | 2019-164359 A1 | 8/2019 |

OTHER PUBLICATIONS

Extended European Search Report dated Sep. 29, 2022, issued in European Patent Application No. 20889400.6-1020.
Chinese Office Action dated Dec. 28, 2023, issued in Chinese Patent Application No. 202080069412.4.

* cited by examiner $E < D$ $A' \leq 0.7 \text{mm}$ $\dfrac{A'}{D} \leq 0.3$ $E < D$ $A' \leq 0.7$ mm $\dfrac{A'}{D} \leq 0.3$ $$E < D'$$

$$A' \leq 0.7 \text{mm}$$

$$\frac{A}{D} \leq 0.3$$

$$\frac{A'}{D'} \leq 0.3$$

$$E < D', E < D''$$

$$A' \leq 0.7 \text{mm}$$

$$\frac{A}{D} \leq 0.3$$

$$\frac{A'}{D'} \leq 0.3$$

$$D' < E$$

$$|A'| \leq 0.25 \times E$$

$$\frac{A}{D} \leq 0.3$$

ELECTRONIC DEVICE INCLUDING CAMERA MODULE

CROSS-REFERENCE TO RELATED APPLICATION(S)

This application is based on and claims priority under 35 U.S.C. § 119(a) of a Korean patent application number 10-2019-0149787, filed on Nov. 20, 2019, in the Korean Intellectual Property Office and of a Korean patent application number 10-2020-0015353 filed on Feb. 10, 2020, in the Korean Intellectual Property Office, the disclosures of each of which is incorporated by reference herein in its entirety.

BACKGROUND

1. Field

The disclosure relates to an electronic device including a camera module.

2. Description of Related Art

Electronic devices, for example, portable electronic devices, have been developed to be applied to various fields sticking to our lives. Such electronic devices have been released with various sizes in accordance with their functions and user preferences, and may include large-screen touch displays for securing of wide visibility and convenience of operations. An electronic device may include at least one camera module (e.g., camera device). The image quality of the camera module is the most important basic performance indicator, and various technologies have been sought to suppress a ghost phenomenon, a flair phenomenon, or a light burst phenomenon (e.g., inner reflection phenomenon) being generated by unnecessary inner light reflection, as one of representative factors hindering the image quality.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including a camera module capable of photographing a subject and displaying the photographed subject through a display. The camera module may include a plurality of lenses disposed to be aligned with the center of an image sensor in an inner space of a barrel member. Each of the plurality of lenses may be structurally combined with the barrel member or may be fixed through an attachment process, such as bonding, taping, or fusion, in the inner space of the barrel member. The lens may include an effective area through which light for generating an image through imaging by an image sensor passes and an ineffective area (e.g., flange) extending from the effective area to fix or mold the lens onto the barrel member regardless of the imaging performance.

The electronic device may have a camera module disposition structure disposed under the display to detect an external environment through at least a part of an opening (e.g., through hole) formed on the display. In this case, in order to reduce the size of the opening of the display as seen from outside, the size of the barrel member should also be reduced, and through this, the size of the ineffective area can also be reduced. However, due to the ineffective area having a relatively reduced size, the light incident from the outside may flow into the ineffective area having a partially reduced size, and a bad influence may be exerted on the image quality performance by the unnecessary inner reflection.

In order to prevent the inner reflection occurring in the ineffective area, a light absorbing material may be applied through the ineffective area of the lens. Such a light absorbing material may be formed on the ineffective area of the lens through a process of painting, deposition coating, or double-shot injection. However, the painting method may cause tilting of the lens due to an inconsistent thickness of the paint, and may require a shape structurally preventing the paint from overflowing. Also, it may be difficult to apply the painting method with respect to an inclined surface, and it may be difficult to accurately control the amount or viscosity of the paint being applied, resulting in the yield deterioration. Further, the deposition coating method may require separate precise deposition jig and deposition equipment, and it may be difficult to apply the deposition coating method with respect to the side surface of the lens. Further, the double-shot injection method may cause a very complicated mold structure and a very high molding difficulty, and thus it may be difficult to obtain desired precision.

Additional aspects will be set forth in part in the description which follows and, in part, will be apparent from the description, or may be learned by practice of the presented embodiments.

In accordance with an aspect of the disclosure, an electronic device is provided. The electronic device includes a camera module configured to reveal a uniform performance in response to various shapes of an ineffective area.

In accordance with an aspect of the disclosure, an electronic device is provided. The electronic device includes a camera module capable of making massive production possible with relatively low costs and helping the improvement of product reliability.

In accordance with an aspect of the disclosure, it an electronic device is provided. The electronic device includes a camera module capable of helping the size reduction of a barrel member by variously changing the structure of an ineffective area.

In accordance with an aspect of the disclosure, an electronic device is provided. The electronic device includes a housing, and a camera module disposed in an inner space of the housing, wherein the camera module includes an image sensor, and a plurality of lenses aligned with the image sensor, and wherein at least one of the plurality of lenses includes a first area formed to transfer at least a part of an external light to the image sensor, and a second area including a light absorbing layer formed to absorb the at least a part of the external light and to penetrate from an outer surface of the lens into an inner space with a predetermined depth.

In accordance with another aspect of the disclosure, an electronic device is provided. The electronic device includes a housing, and a camera module disposed in an inner space of the housing, wherein the camera module includes: an image sensor, and at least one lens including a first area formed to pass at least a part of an external light of the electronic device to the image sensor and a second area disposed to surround the first area at least partly, and wherein the at least one lens includes a first surface, a second surface directed in an opposite direction to the first surface, a lens side surface surrounding an inner space between the first surface and the second surface, an anti-reflection coating layer formed on the first surface and/or the second surface at least in the first area, and a light absorbing layer formed from the first surface and the second surface to at least a part of the inner space with a predetermined penetration depth in the second area.

In accordance with another aspect of the disclosure, a camera module is provided. The camera module includes an image sensor, and at least one lens including a first area formed to pass at least a part of an external light of an electronic device to the image sensor and a second area disposed to surround the first area at least partly, wherein the at least one lens includes a first surface, a second surface directed in an opposite direction to the first surface, a lens side surface surrounding an inner space between the first surface and the second surface, an anti-reflection coating layer formed on the first surface and/or the second surface at least in the first area, and a light absorbing layer formed from the first surface and the second surface to at least a part of the inner space with a predetermined penetration depth in the second area.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
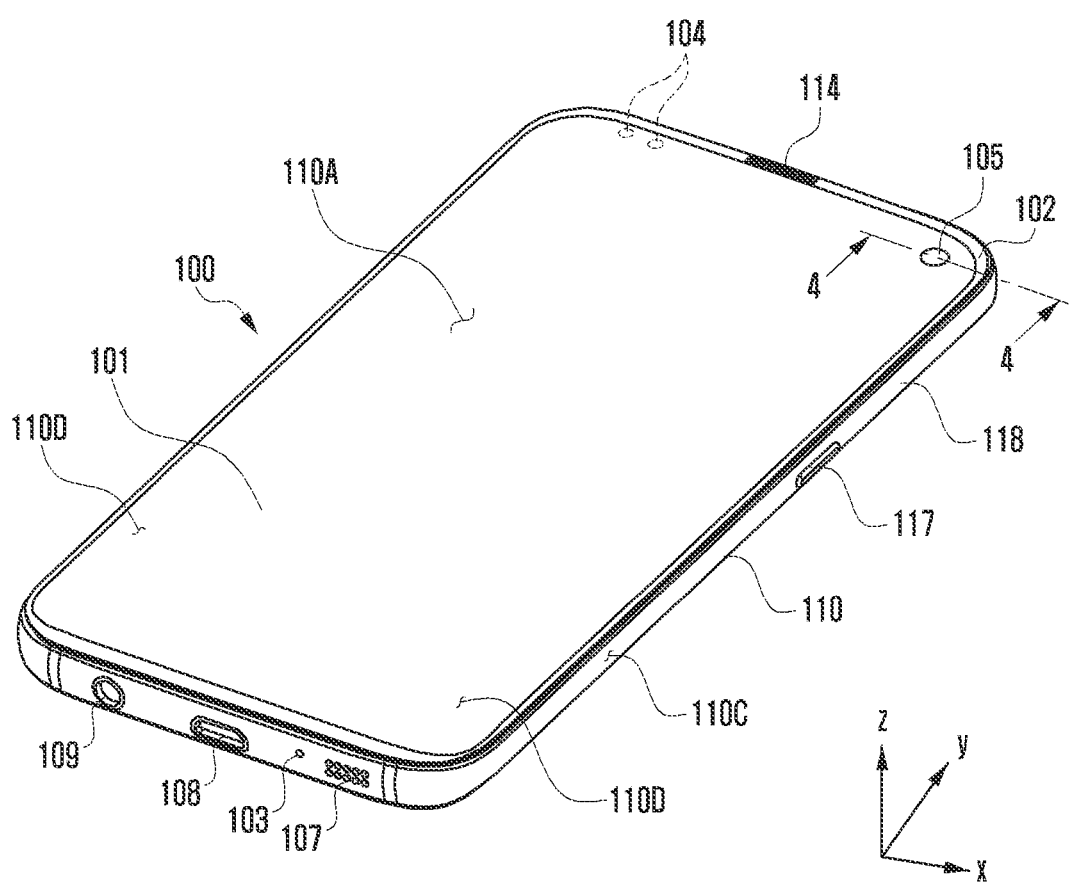
FIG. 1 is a perspective view of a front side of a mobile electronic device according to an embodiment of the disclosure.

FIG. 1 illustrates a perspective view showing a front surface of a mobile electronic device according to an embodiment of the disclosure.

Figure 2:
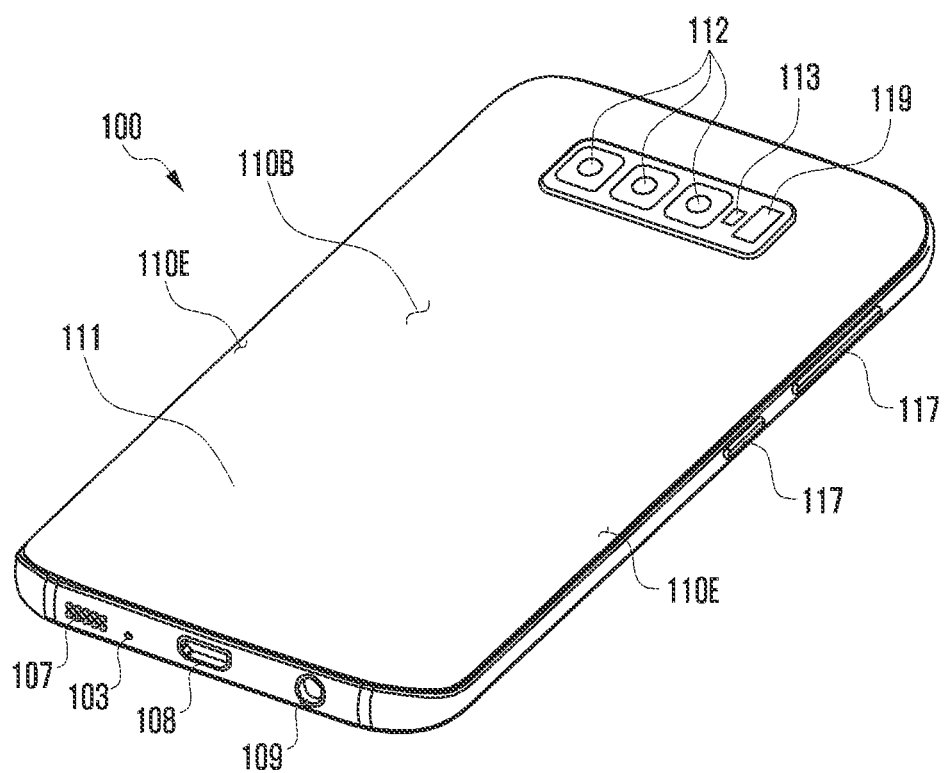
FIG. 2 is a perspective view of a rear side of the electronic device of FIG. 1 according to an embodiment of the disclosure.

FIG. 2 illustrates a perspective view showing a rear surface of the mobile electronic device shown in FIG. 1 according to an embodiment of the disclosure.

Referring to FIGS. 1 and 2, a mobile electronic device 100 may include a housing 110 that includes a first surface (or front surface) 110A, a second surface (or rear surface) 110B, and a lateral surface 110C that surrounds a space between the first surface 110A and the second surface 110B. The housing 110 may refer to a structure that forms a part of the first surface 110A, the second surface 110B, and the lateral surface 110C. The first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

The front plate 102 may include two first regions 110D disposed at long edges thereof, respectively, and bent and extended seamlessly from the first surface 110A toward the rear plate 111. Similarly, the rear plate 111 may include two second regions 110E disposed at long edges thereof, respectively, and bent and extended seamlessly from the second surface 110B toward the front plate 102. The front plate 102 (or the rear plate 111) may include only one of the first regions 110D (or of the second regions 110E). The first regions 110D or the second regions 110E may be omitted in part. When viewed from a lateral side of the mobile electronic device 100, the lateral bezel structure 118 may have a first thickness (or width) on a lateral side where the first region 110D or the second region 110E is not included, and may have a second thickness, being less than the first thickness, on another lateral side where the first region 110D or the second region 110E is included.

The mobile electronic device 100 may include at least one of a display 101, audio modules 103, 107 and 114, sensor modules 104 and 119, camera modules 105, 112 and 113, a key input device 117, a light emitting device, and connector holes 108 and 109. The mobile electronic device 100 may omit at least one (e.g., the key input device 117 or the light emitting device) of the above components, or may further include other components.

The display 101 may be exposed through a substantial portion of the front plate 102, for example. At least a part of the display 101 may be exposed through the front plate 102 that forms the first surface 110A and the first region 110D of the lateral surface 110C. Outlines (i.e., edges and corners) of the display 101 may have substantially the same form as those of the front plate 102. The spacing between the outline of the display 101 and the outline of the front plate 102 may be substantially unchanged in order to enlarge the exposed area of the display 101.

A recess or opening may be formed in a portion of a display area of the display 101 to accommodate at least one of the audio module 114, the sensor module 104, the camera module 105, and the light emitting device. At least one of the audio module 114, the sensor module 104, the camera module 105, a fingerprint sensor (not shown), and the light emitting element may be disposed on the back of the display area of the display 101. The display 101 may be combined with, or adjacent to, a touch sensing circuit, a pressure sensor capable of measuring the touch strength (pressure), and/or a digitizer for detecting a stylus pen. At least a part of the sensor modules 104 and 119 and/or at least a part of the key input device 117 may be disposed in the first region 110D and/or the second region 110E.

The audio modules 103, 107 and 114 may correspond to a microphone hole 103 and speaker holes 107 and 114, respectively. The microphone hole 103 may contain a microphone disposed therein for acquiring external sounds and, in a case, contain a plurality of microphones to sense a sound direction. The speaker holes 107 and 114 may be classified into an external speaker hole 107 and a call receiver hole 114. The microphone hole 103 and the speaker holes 107 and 114 may be implemented as a single hole, or a speaker (e.g., a piezo speaker) may be provided without the speaker holes 107 and 114.

The sensor modules 104 and 119 may generate electrical signals or data corresponding to an internal operating state of the mobile electronic device 100 or to an external environmental condition. The sensor modules 104 and 119 may include a first sensor module 104 (e.g., a proximity sensor) and/or a second sensor module (e.g., a fingerprint sensor) disposed on the first surface 110A of the housing 110, and/or a third sensor module 119 (e.g., a heart rate monitor (HRM) sensor) and/or a fourth sensor module (e.g., a fingerprint sensor) disposed on the second surface 110B of the housing 110. The fingerprint sensor may be disposed on the second surface 110B as well as the first surface 110A (e.g., the display 101) of the housing 110. The mobile electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device 105 disposed on the first surface 110A of the mobile electronic device 100, and a second camera device 112 and/or a flash 113 disposed on the second surface 110B. The camera module 105 or the camera module 112 may include one or more lenses, an image sensor, and/or an image signal processor. The flash 113 may include, for example, a light emitting diode or a xenon lamp. Two or more lenses (infrared cameras, wide angle and telephoto lenses) and image sensors may be disposed on one side of the mobile electronic device 100.

The key input device 117 may be disposed on the lateral surface 110C of the housing 110. The mobile electronic device 100 may not include some or all of the key input device 117 described above, and the key input device 117 which is not included may be implemented in another form such as a soft key on the display 101. The key input device 117 may include the sensor module disposed on the second surface 110B of the housing 110.

The light emitting device may be disposed on the first surface 110A of the housing 110. For example, the light emitting device may provide status information of the mobile electronic device 100 in an optical form. The light emitting device may provide a light source associated with the operation of the camera module 105. The light emitting device may include, for example, a light emitting diode (LED), an IR LED, or a xenon lamp.

The connector holes 108 and 109 may include a first connector hole 108 adapted for a connector (e.g., a universal serial bus (USB) connector) for transmitting and receiving power and/or data to and from an external electronic device, and/or a second connector hole 109 adapted for a connector (e.g., an earphone jack) for transmitting and receiving an audio signal to and from an external electronic device.

Some sensor modules 105 of camera modules 105 and 112, some sensor modules 104 of sensor modules 104 and 119, or an indicator may be arranged to be exposed through a display 101. For example, the camera module 105, the sensor module 104, or the indicator may be arranged in the internal space of a mobile electronic device 100 so as to be brought into contact with an external environment through an opening of the display 101, which is perforated up to a front plate 102. In another embodiment, some sensor modules 104 may be arranged to perform their functions without being visually exposed through the front plate 102 in the internal space of the electronic device. For example, in this case, an area of the display 101 facing the sensor module may not require a perforated opening.

Figure 3:
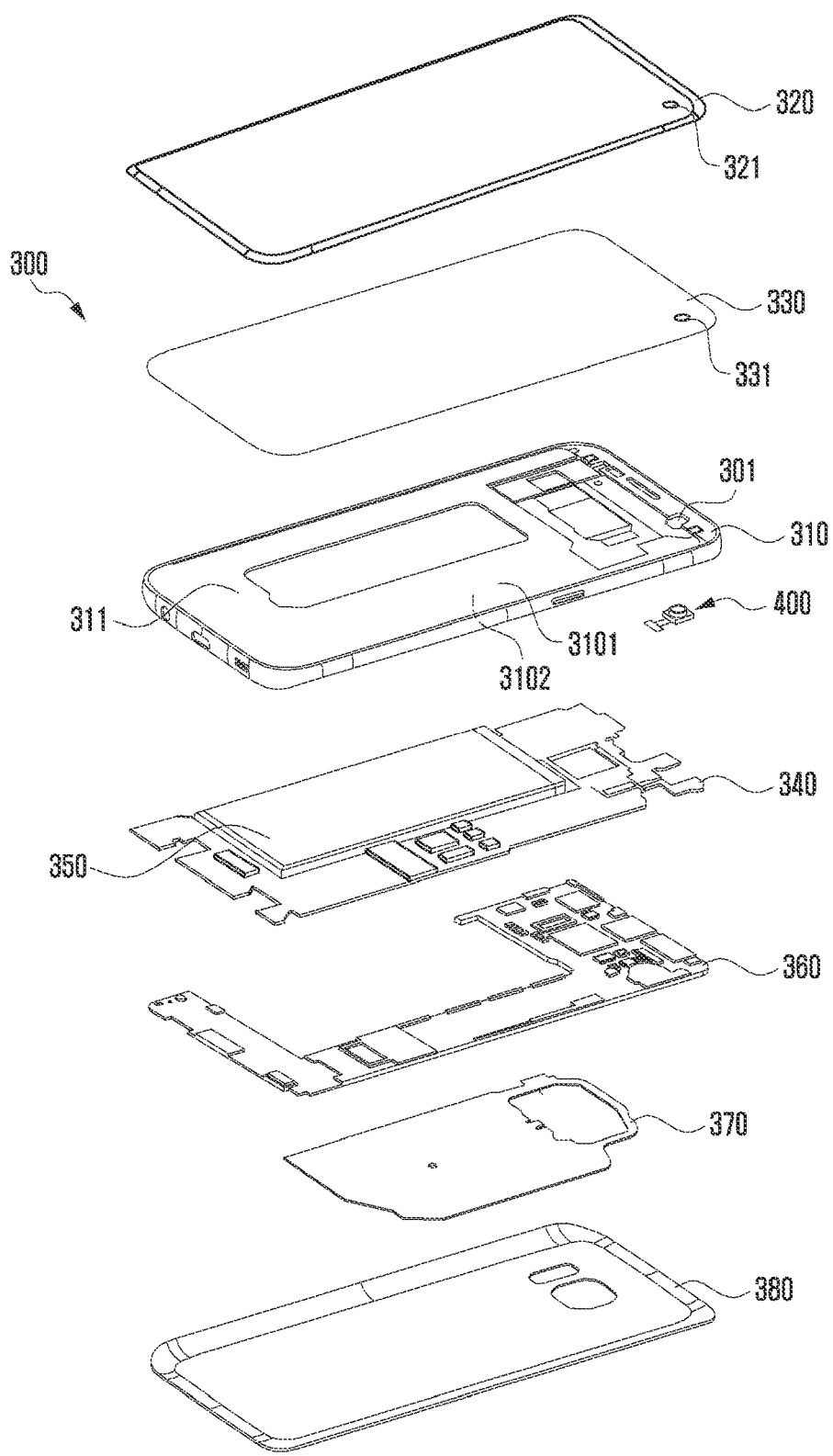
FIG. 3 is an exploded perspective view of the electronic device of FIG. 1 according to an embodiment of the disclosure.

FIG. 3 illustrates an exploded perspective view showing a mobile electronic device shown in FIG. 1 according to an embodiment of the disclosure.

Referring to FIG. 3, a mobile electronic device 300 may include a lateral bezel structure 310, a first support member 311 (e.g., a bracket), a front plate 320, a display 330, an electromagnetic induction panel (not shown), a printed circuit board (PCB) 340, a battery 350, a second support member 360 (e.g., a rear case), an antenna 370, and a rear plate 380. The mobile electronic device 300 may omit at least one (e.g., the first support member 311 or the second support member 360) of the above components or may further include another component. Some components of the mobile electronic device 300 may be the same as or similar to those of the mobile electronic device 100 shown in FIG. 1 or FIG. 2, thus, descriptions thereof are omitted below.

The first support member 311 is disposed inside the mobile electronic device 300 and may be connected to, or integrated with, the lateral bezel structure 310. The first support member 311 may be formed of, for example, a metallic material and/or a non-metal (e.g., polymer) material. The first support member 311 may be combined with the display 330 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

According to various embodiments, a first support plate (e.g., first support member 311) of a side frame (e.g., lateral bezel structure 310) may include a first surface 3101 directed toward a front plate 320 and a second surface 3102 directed in an opposite direction (e.g., rear plate direction) to the first surface 3101. According to an embodiment, a camera module 400 (e.g., camera module 105 of FIG. 1) may be disposed between the first support member 311 and a rear plate 380. According to an embodiment, the camera module 400 may project or may be disposed to project in a direction of the front plate 320 through a first through-hole 301 connected from the first surface 3101 to the second surface 3102 of the first support member 311. According to an embodiment, a portion projecting through the first through-hole 301 of the camera module 400 may be disposed to approach or contact the rear surface of the front plate 320 through a second through-hole 331 formed in a location corresponding to a display 330. As another embodiment, in case that the camera module 400 is disposed between the display 330 and the first support member 311, the first through-hole 301 may not be necessary. As another embodiment, in case that the camera module 400 is disposed between the display 330 and the first support member 311, the second through-hole 331 formed on the display 330 (e.g., display panel) may not be necessary. In this case, a corresponding area of the display 330 (e.g., display panel) corresponding to the camera module 400 may be formed as an area having a relatively higher permeability than that of the surroundings by re-disposing the structure of pixels or electrical wirings.

According to various embodiments, the camera module 400 may be disposed to detect an external environment through a camera exposure area 321 formed in a corresponding location of the front plate 320 to penetrate through the first through-hole 301 and the second through-hole 331 at least partly in an inner space of a mobile electronic device 300. According to an embodiment, the camera exposure area 321 may actually include a transparent area facing a first area (e.g., effective area) of at least one lens (e.g., first lens 431 of FIG. 4) disposed in a barrel member (e.g., barrel member 420 of FIG. 4) of the camera module 400. As another embodiment, the camera exposure area 321 may include a print area surrounding the transparent area with a predetermined width.

Hereinafter, various embodiments of a disposition structure of the camera module 400 in the mobile electronic device 300 will be described in detail.

Figure 4:
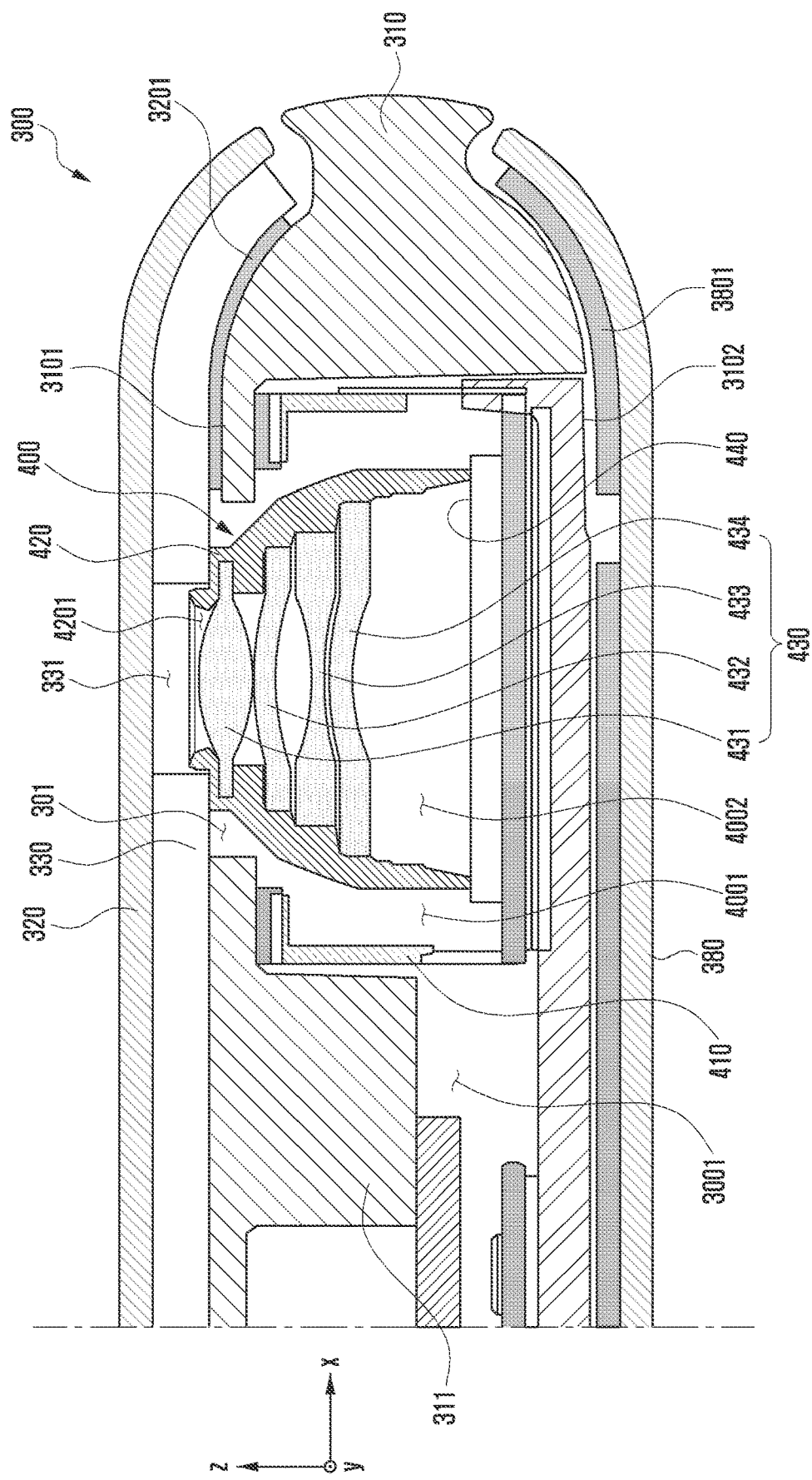
FIG. 4 is a partial cross-sectional view of an electronic device taken along line 4-4 of FIG. 1 according to an embodiment of the disclosure.

FIG. 4 is a partial cross-sectional view of an electronic device, taken along line 4-4 of FIG. 1 according to an embodiment of the disclosure.

The mobile electronic device 300 of FIG. 4 may be similar to the mobile electronic device 100 of FIG. 1 and FIG. 2 at least partly, or may include other embodiments of the electronic device.

Referring to FIG. 4, a mobile electronic device 300 may include a front plate 320 (e.g., front cover, first cover, first plate, or front window) directed in a first direction (Z-axis direction), a rear plate 380 (e.g., rear cover, second cover, second plate, or rear window) directed in an opposite direction to the front plate 320, and a side frame (e.g., lateral bezel structure 310 or side member) surrounding a space 3001 between the front plate 320 and the rear plate 380. According to an embodiment, the mobile electronic device 300 may include a first waterproof member 3201 disposed between the display 330 and the side frame (e.g., lateral bezel structure 310). According to an embodiment, the mobile electronic device 300 may include a second waterproof member 3801 disposed between the side frame (e.g., lateral bezel structure 310) and the rear plate 380. The first waterproof member 3201 and the second waterproof member 3801 may prevent external foreign substances or moisture from flowing into the inner space 3001 of the mobile electronic device 300.

According to various embodiments, the side frame (e.g., lateral bezel structure 310) may further include a first support member 311 (e.g., first support plate of FIG. 3) at least partly extending toward the inner space 3001 of the mobile electronic device 300. According to an embodiment, the first support member 311 may be formed by a structural combination with the side frame (e.g., lateral bezel structure 310). According to an embodiment, the first support member 311 may include a first through-hole 301 formed to accommodate the barrel member 420 of the camera module 400 disposed between the first support member 311 and the rear plate 380. According to an embodiment, the first support member 311 may include a support structure for fixing the location thereof as at least a part of the barrel member 420 of the camera module 400 penetrates through the first through-hole 301. As another embodiment, in case that the camera module 400 is disposed between the first support member 311 and the front plate 320, the first through-hole 301 may not be necessary.

According to various embodiments, the display 330 may include the second through-hole 331 formed in a location facing the first through-hole 301. According to an embodiment, the barrel member 420 of the camera module 400 may be disposed to approach or contact the rear surface of the front plate 320 through the second through-hole 331. As another embodiment, in case that the camera module 400 is disposed between the first support member 311 and the front plate 320, the second through-hole 331 of the display 330 may not be necessary at least partly. For example, the second through-hole 331 may be formed only on a subsidiary material layer (e.g., cushion layer, embossed layer, or metal sheet layer) disposed under the display panel, excluding the display panel of the display 330. In this case, the area corresponding to the camera module 400 of the display panel may be formed to have a higher permeability than that of the surroundings by changing the disposition structure (e.g., disposition density) of the pixels or electrical wirings.

According to various embodiments, the camera module 400 may include a camera housing 410, a barrel member 420 projecting at least partly from the camera housing 410, a plurality of lenses 430: 431, 432, 433, and 434 disposed at predetermined intervals in an inner space 4002 of the barrel member 420, and/or at least one image sensor 440 disposed so that the center thereof is aligned with the plurality of lenses 430 in the inner space 4001 of the camera housing 410. As another embodiment, the camera module 400 may not include the camera housing 410. In this case, the image sensor 440 may be disposed in the inner space 4002 of the barrel member 420.

According to various embodiments, the barrel member 420 may penetrate through the first through-hole 301 of the first support member 311 and the second through-hole 331 of the display 330, and may be disposed close to the rear surface of the front plate 320. According to an embodiment, the plurality of lenses 430 may be disposed in the inner space 4002 of the barrel member 420 so that the location thereof is supported through the structural shape thereof. According to an embodiment, the plurality of lenses 430 may be disposed to face the camera exposure area (e.g., camera exposure area 321 of FIG. 3) of the front plate 320 through an opening 4201 formed on the barrel member 420. According to an embodiment, when the camera module 400 (e.g., fixed focus camera (FF camera)) performs focusing of an image, a relative distance between the barrel member 420 and the front plate 320 may be fixed. According to an embodiment, when the camera module 400 (e.g., auto focus camera (AF camera)) performs focusing of an image, the barrel member 420 may be disposed in the camera housing 410 so that the relative distance with the front plate 320 is varied. For example, the camera module 400 may include a driving motor (e.g., voice coil motor (VCM)) (not illustrated) for moving the barrel member 420, and through the driving motor, the relative distance between the barrel member 420 and the front plate 320 may be varied.

According to various embodiments of the disclosure, each of the plurality of lenses 430 may include a first area (e.g., effective area) (e.g., first area A1 of FIG. 5) passing light for generating an image being formed by the image sensor 440, and a second area (e.g., ineffective area) (e.g., second area A2 of FIG. 5) extending from the first area and being fixed at least partly in the inner space 4002 of the barrel member 420. According to an embodiment, the plurality of lenses 430 may be fixed through a combination structure, such as structural combination (e.g., fitting), bonding, fusion, or taping, inside the barrel member 420. According to various embodiments, the light passing through the first area may cause unnecessary inner reflection to occur due to the second area, and a part of the light by such inner reflection may cause image forming through the image sensor 440, resulting in that a bad influence may be exerted on the image quality.

According to various embodiments, in order to prevent the above-described inner reflection, each of the plurality of lenses 430 may include a light absorbing layer (e.g., light absorbing layer 4312 of FIG. 5) (e.g., opaque layer) formed in the second area. According to an embodiment, the light absorbing layer (e.g., light absorbing layer 4312 of FIG. 5) may be formed in a manner that a colored dye penetrates into the second area of the lens formed of a polymer material with a predetermined depth through dipping or immersion.

Figure 5:
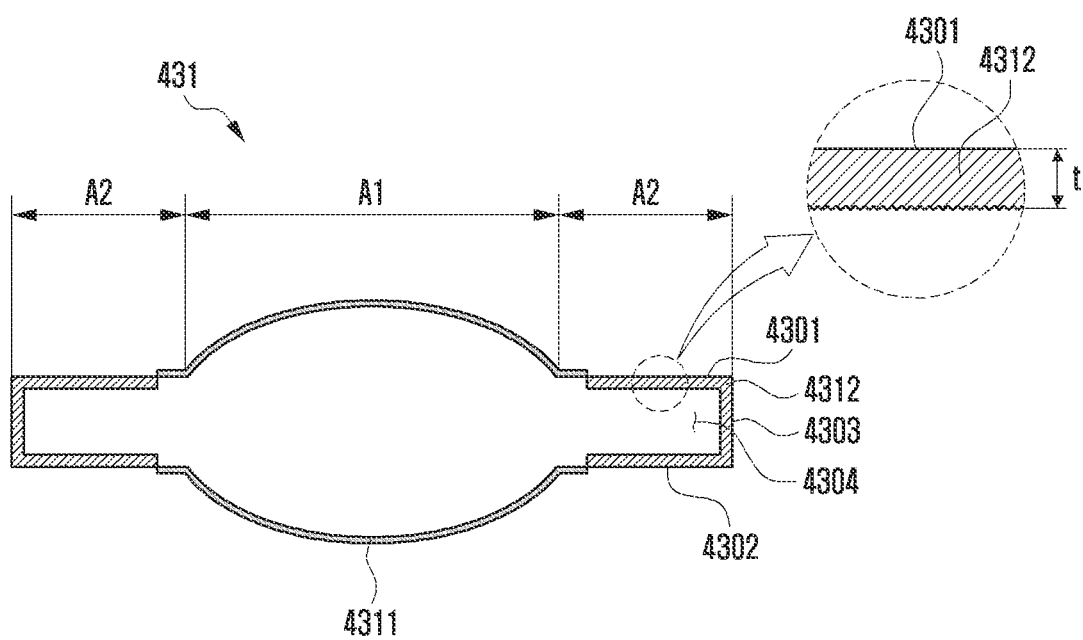
FIG. 5 is a view illustrating a cross-sectional structure of a lens according to an embodiment of the disclosure.

FIG. 5 is a view illustrating a cross-sectional structure of a lens according to an embodiment of the disclosure.

Although the lens 431 of FIG. 5 is illustrated and described as one of the plurality of lenses 430 of FIG. 4, it is not limited thereto. For example, the lens 431 of FIG. 5 may be replaced by at least one of a plurality of remaining lenses 432, 433, and 434 of FIG. 4.

The lens 431 of FIG. 5 may be replaced by any one of not only a general circular lens but also a light fixture part, such as various types of non-circular type lenses (e.g., D-cut type lenses), filters, prisms, or films.

Referring to FIG. 5, the lens 431 may be formed through polymer material molding (e.g., molding). According to an embodiment, the lens 431 may include a first surface 4301, a second surface 4302 directed in an opposite direction to the first surface 4301, and a lens side surface 4303 surrounding an inner space 4304 (e.g., inner area between the first surface 4301 and the second surface 4302) between the first surface 4301 and the second surface 4302. According to an embodiment, the lens 431 may include a first area A1 and a second area A2 extending from the first area A1. According to an embodiment, the first area A1 may include an effective area through which light for generating an image through imaging by an image sensor (e.g., image sensor 440 of FIG. 4) passes. According to an embodiment, the second area A2 may include an ineffective area extending from the effective area in order for the lens 431 to be fixed or molded onto a surrounding structure (e.g., barrel member) regardless of the imaging performance of the image sensor 440. According to an embodiment, the second area A2 may extend at least partly outward along a border of the first area A1. According to an embodiment, the extended length of the second area A2 may be determined in accordance with a disposition structure in which the lens 431 is disposed on the surrounding structure. According to an embodiment, the lens 431 may include an anti-reflection coating layer 4311 formed on the first surface 4301 and the second surface 4302 at least in the first area A1. According to an embodiment, the anti-reflection coating layer 4311 may be formed to maintain the permeation performance without degrading the permeability of the lens A1 in the first area A1 of the lens 431. According to an embodiment, the anti-reflection coating layer 4311 may be formed at least on the first surface 4301 and the second surface 4302 through a deposition process using SiO2, TiO2, or ZrO2.

According to various embodiments, the lens 431 may include the light absorbing layer 4312 formed in the second area A2. According to an embodiment, through dipping or immersion, the light absorbing layer 4312 may be formed in the second area A2 of the lens 431 through a coloring liquid (e.g., dyeing or dye) penetrating from surfaces of the first surface 4301, the second surface 4302, and the lens side surface 4303 into the inner space 4304 of the lens 431 with a designated depth t. According to an embodiment, the penetration depth t of the coloring liquid may be the depth enough to prevent the occurrence of the inner reflection. For example, the penetration depth t of the coloring liquid may be at least 200 nm. According to an embodiment, the penetration depth t of the coloring liquid may be in the range of about 240 nm to 250 nm. According to an embodiment, in case of applying the dipping or immersion, the surfaces of the first surface 4301, the second surface 4302, and/or the lens side surface 4303 in the second area A2 of the lens 431 may be surface-treated to reduce the penetration time of the coloring liquid and to improve the penetration force. For example, the surface process may be formed through roughness adjustment.

According to various embodiments, the penetration depth t of the coloring liquid may be adjusted by the density, ingredient, temperature, or dipping or immersion time of the coloring liquid, or the ingredient of a base material.

According to various embodiments, as the color of the light absorbing layer 4312, black is generally effective in preventing the inner reflection, but the coloring liquid of various colors may be used to obtain an intentional color. For example, in the second area A2 of the lens 431, the light absorbing layer 4312 of various colors can be obtained in accordance with the color of the coloring liquid, such as red, blue, green, or yellow.

According to various embodiments, the anti-reflection coating layer 4311 may extend from the first area A1 to at least a part of the second area A2. In this case, partial permeability deterioration of the first area A1 due to the light absorbing layer 4312 formed on a boundary portion between the first area A1 and the second area A2 can be prevented.

Figure 6A:
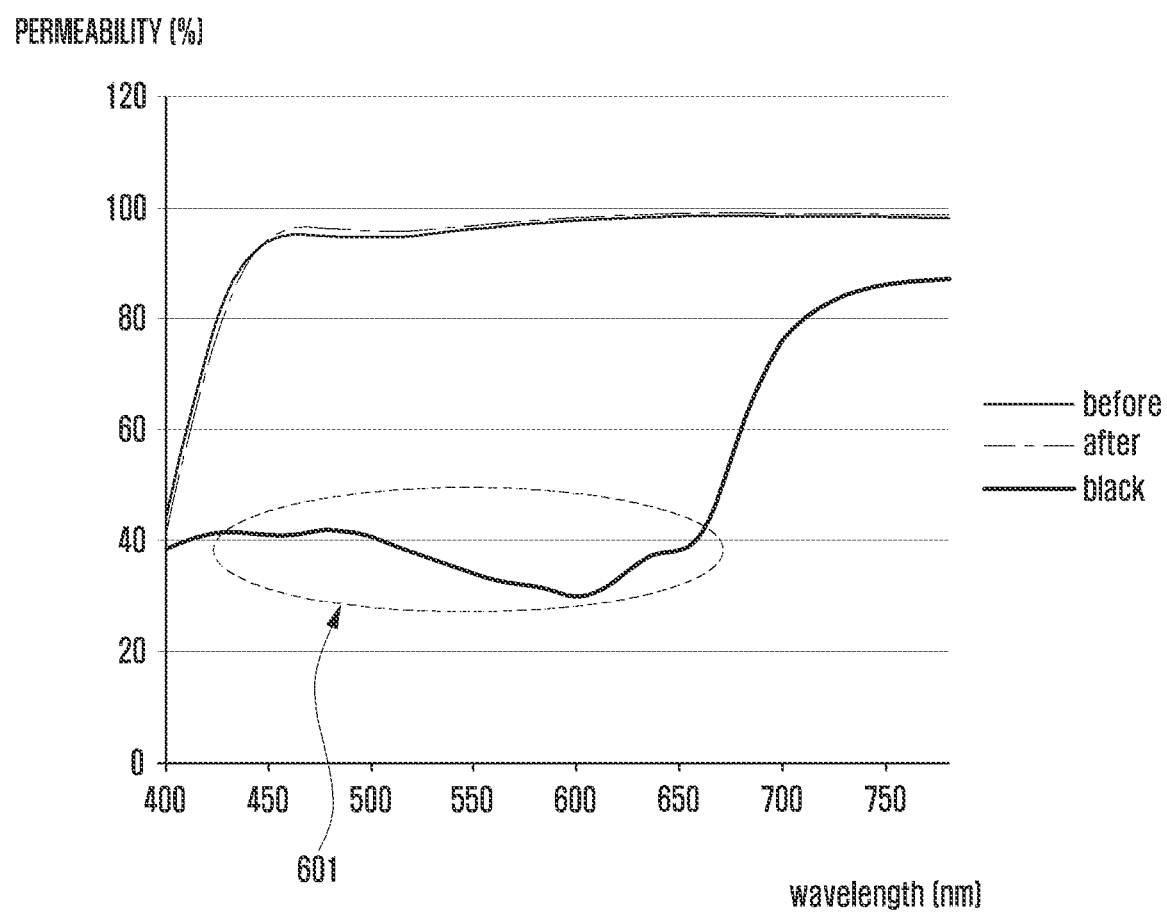
FIG. 6A is a graph illustrating permeability of a first area and a second area in a comparative manner according to an embodiment of the disclosure.
Figure 6B:
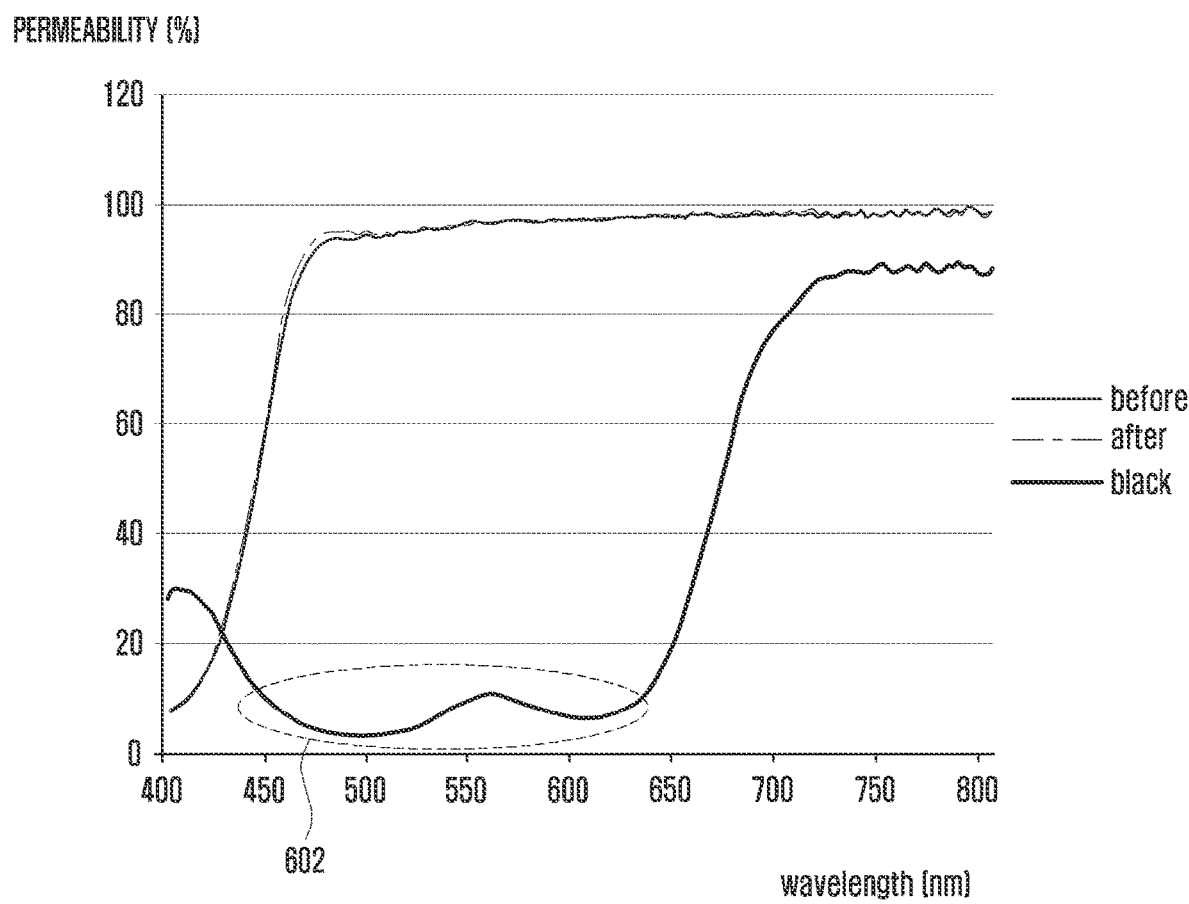
FIG. 6B is a graph illustrating permeability of a first area and a second area in a comparative manner according to an embodiment of the disclosure.

FIGS. 6A and 6B are graphs illustrating the permeability of a first area A1 and a second area A2 in a comparative manner according to various embodiments of the disclosure.

Referring to FIGS. 5 and 6A, the first area A1 including the anti-reflection coating layer 4311 of the lens 431 reveals a high permeability both before and after the dipping or immersion is applied, but the second area A2 reveals a relatively low permeability of about 40% (black) in an effective wavelength band (area 601). This means that the first area A1 maintains an excellent permeability since the coloring liquid is unable to penetrate by the anti-reflection coating layer 4311 even after the dipping or immersion is applied, whereas the second area A2 having no anti-reflection coating layer 4311 can help suppressing of the inner reflection since the permeability is remarkably lowered due to the dyeing through the coloring liquid.

According to various embodiments, the permeability of the light absorbing layer 4312 of the second area A2 may be adjusted by the density, ingredient, temperature, or dipping or immersion time of the coloring liquid, or the ingredient of a base material.

Referring to FIG. 6B, the first area A1 including the anti-reflection coating layer 4311 of the lens 431 reveals the high permeability both before and after the dipping or immersion is applied, but the second area A2 reveals a relatively low permeability of about 10% (black) in the effective wavelength band (area 602). This means that it is possible to adjust the permeability in the second area A2 of the lens 431 by making different penetration depths t of the coloring liquid in accordance with the density, ingredient, temperature, or dipping or immersion time of the coloring liquid, or the ingredient of the base material.

FIGS. 7A to 7F are views illustrating a cross-sectional structure of a lens according to various embodiments of the disclosure.

Although the lens 431 of FIGS. 7A to 7F is illustrated and described as one of the plurality of lenses 430 of FIG. 4, it is not limited thereto. For example, the lens 431 of FIGS. 7A to 7F may be replaced by at least one of a plurality of remaining lenses 432, 433, and 434 of FIG. 4.

According to various embodiments, light absorbing layers 4313, 4314, and 4315 provided to the second area A2 (e.g., ineffective area) to reduce the inner reflection may have various shapes.

Figure 7A:
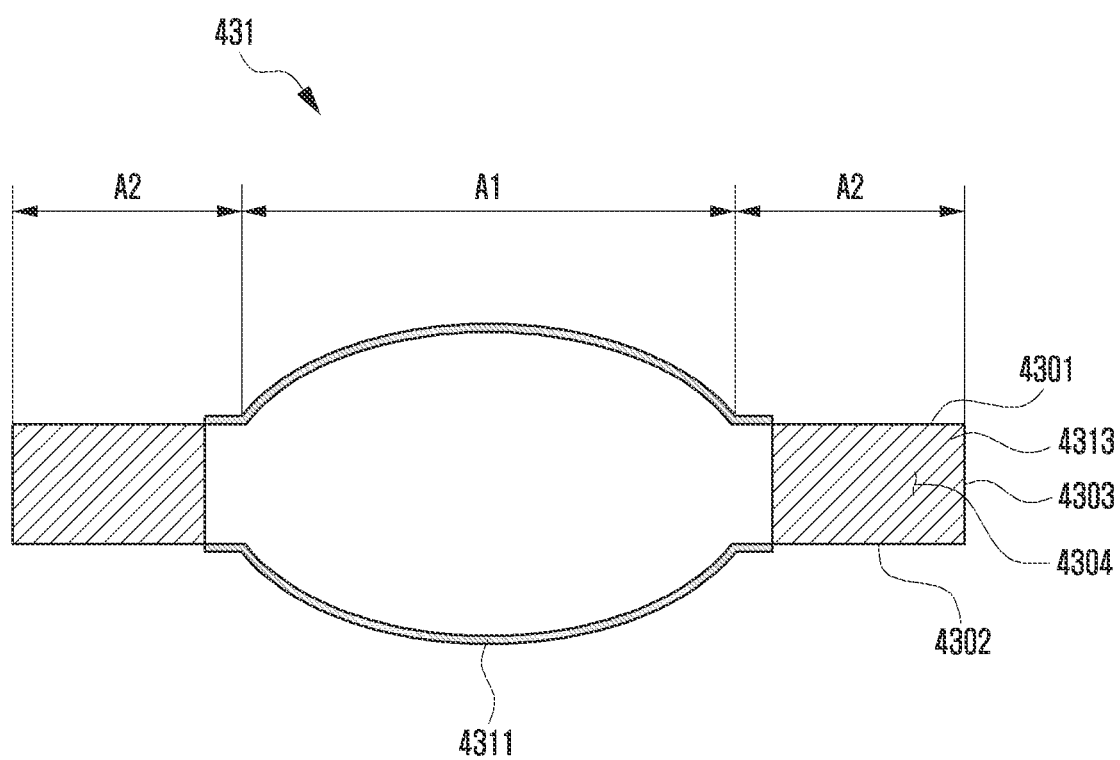
FIG. 7A is a view illustrating a cross-sectional structure of a lens according to an embodiment of the disclosure.

FIG. 7A is a view illustrating a cross-sectional structure of a lens according to an embodiment of the disclosure.

Referring to FIG. 7A, the light absorbing layer 4313 may be formed to be all filled from the first surface 4301 to the second surface 4302 through an inner space 4304 of the lens 431, excluding an anti-reflection coating layer 4311, in the second area A2 (e.g., ineffective area). For example, the corresponding structure can be obtained by increasing the temperature of a dye or sufficiently lengthening the dyeing time.

Figure 7B:
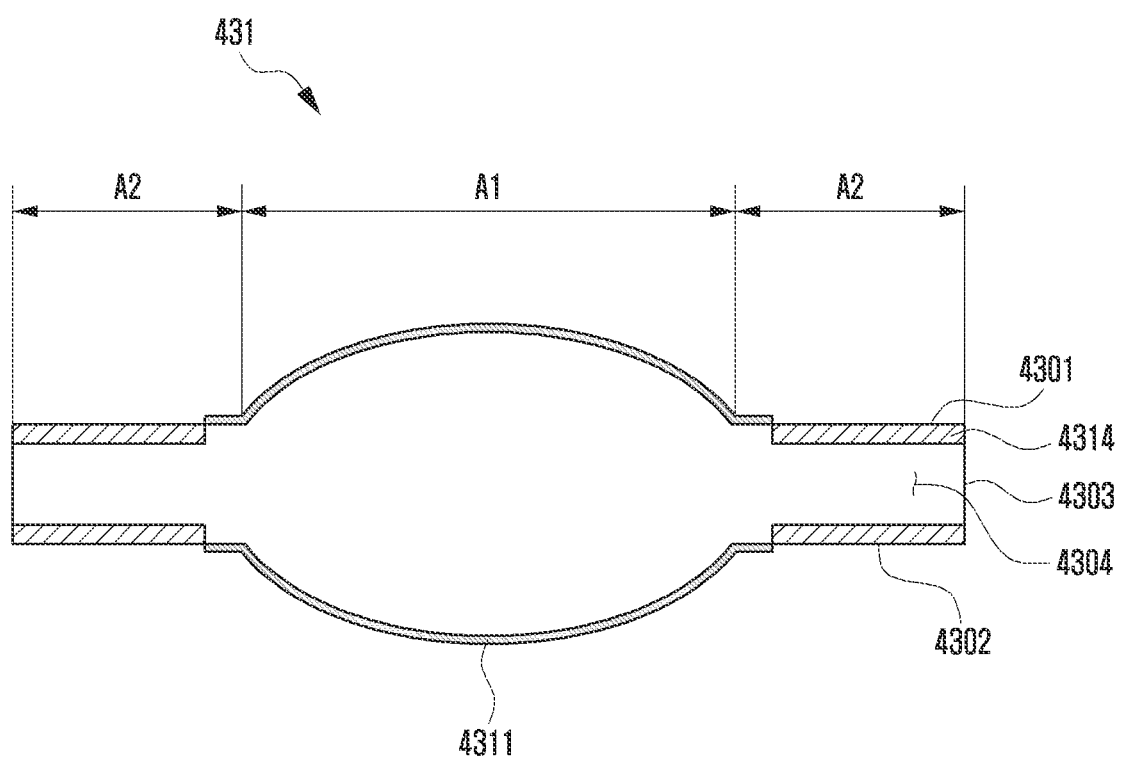
FIG. 7B is a view illustrating a cross-sectional structure of a lens according to an embodiment of the disclosure.

FIG. 7B is a view illustrating a cross-sectional structure of a lens according to an embodiment of the disclosure.

Referring FIG. 7B, the light absorbing layer 4314 may be formed from the first surface 4301 and the second surface 4302 to the inner space 4304 with a predetermined depth, excluding the anti-reflection coating layer 4311 and a lens side surface 4303, in the second area A2 (e.g., ineffective area).

Figure 7C:
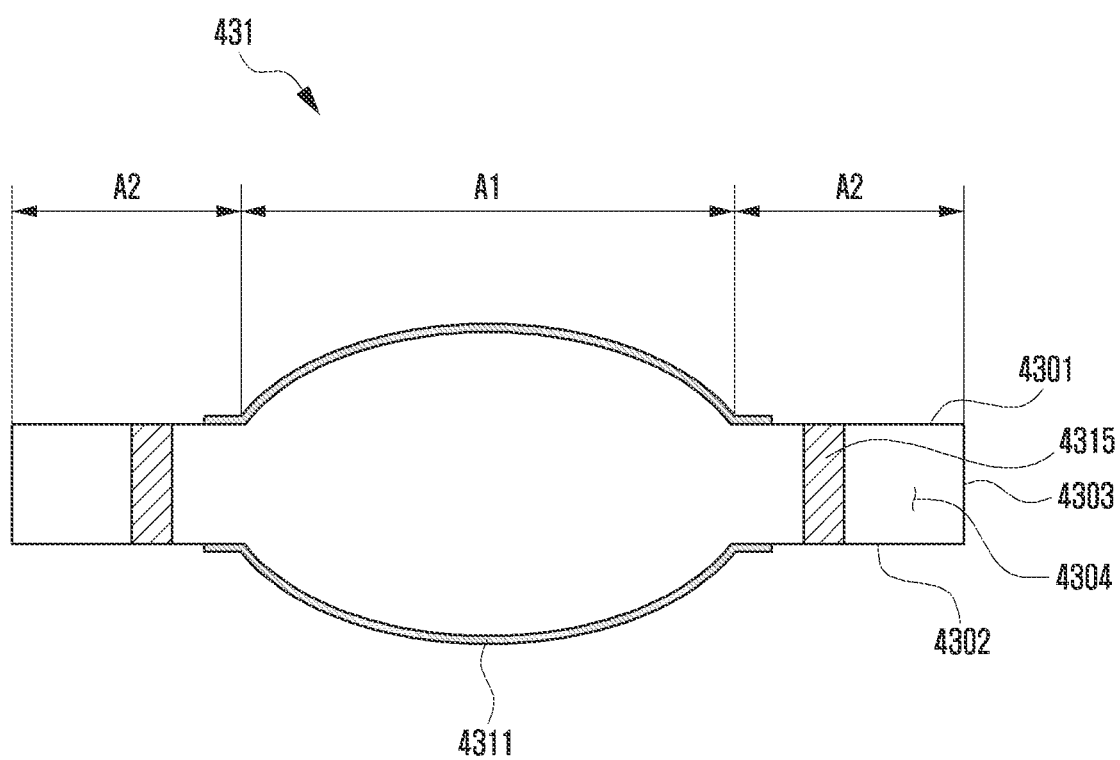
FIG. 7C is a view illustrating a cross-sectional structure of a lens according to an embodiment of the disclosure.

FIG. 7C is a view illustrating a cross-sectional structure of a lens according to an embodiment of the disclosure.

Referring to FIG. 7C, the light absorbing layer 4315 may be formed to be filled from a part of the first surface 4301 to the second surface 4302 through the inner space 4304 with a predetermined width, excluding the anti-reflection coating layer 4311, in the second area A2 (e.g., ineffective area). In this case, an external light passes through the light absorbing layer 4315 formed from the first surface 4301 of the lens 431 to the second surface 4302 through the inner space 4304, and the inner reflection phenomenon can be prevented in the second area A2.

Figure 7D:
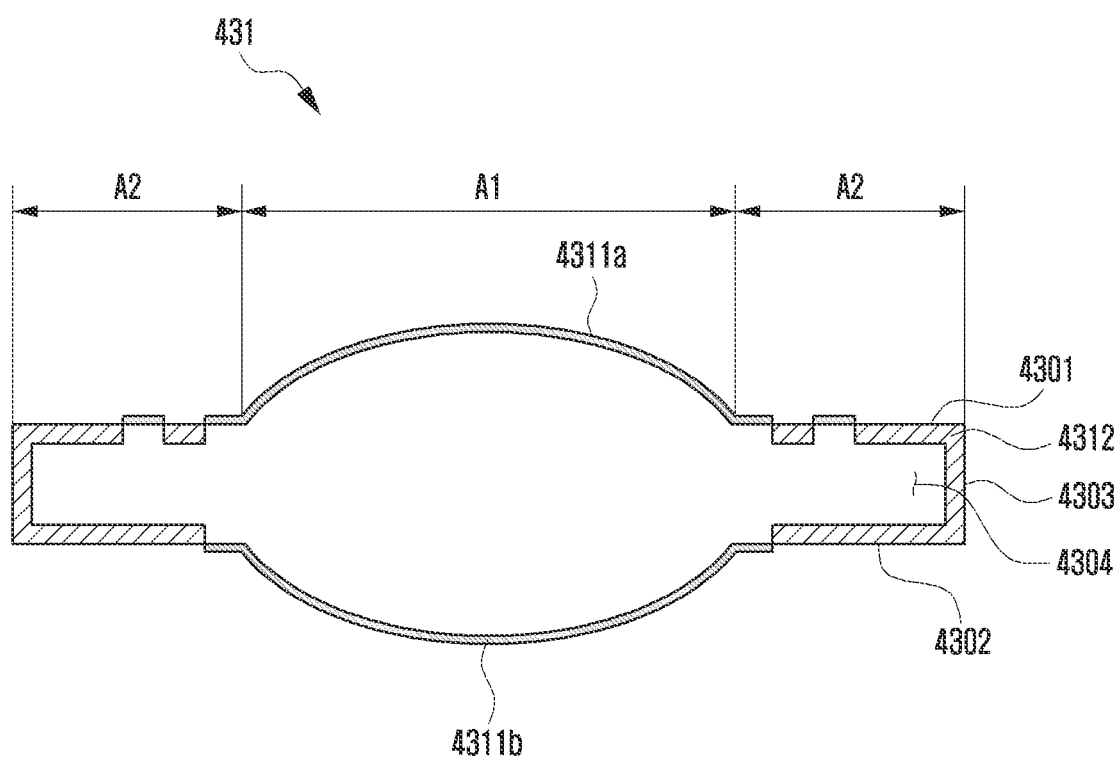
FIG. 7D is a view illustrating a cross-sectional structure of a lens according to an embodiment of the disclosure.

FIG. 7D is a view illustrating a cross-sectional structure of a lens according to an embodiment of the disclosure.

Referring to FIG. 7D, the light absorbing layer 4312 may be formed to be cut off at least once on the second area A2 (e.g., ineffective area) by removing a part of the anti-reflection coating layer 4311a or by preventing the anti-reflection coating layer from being partially formed through a special surface process.

Figure 7E:
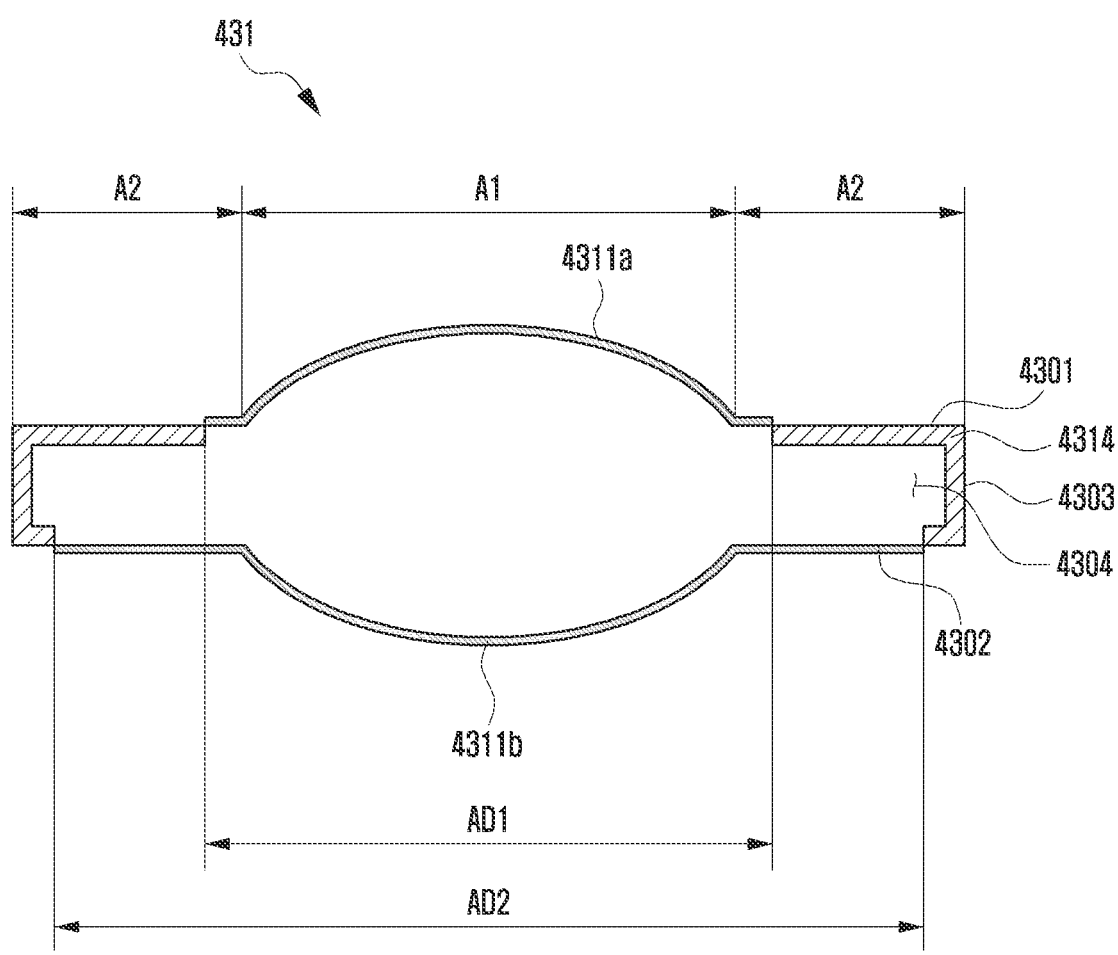
FIG. 7E is a view illustrating a cross-sectional structure of a lens according to an embodiment of the disclosure.

FIG. 7E is a view illustrating a cross-sectional structure of a lens according to an embodiment of the disclosure.

Referring to FIG. 7E, it is possible to form the light absorbing layer 4312 only on an intended region by differently forming a diameter AD1 of the anti-reflection coating layer 4311a of the first surface 4301 and a diameter AD2 of the anti-reflection coating layer 4311b of the second surface 4302. Through this, the light absorbing layer 4312 may be formed to have different inner diameters formed on the first surface 4301 and the second surface 4302.

Figure 7F:
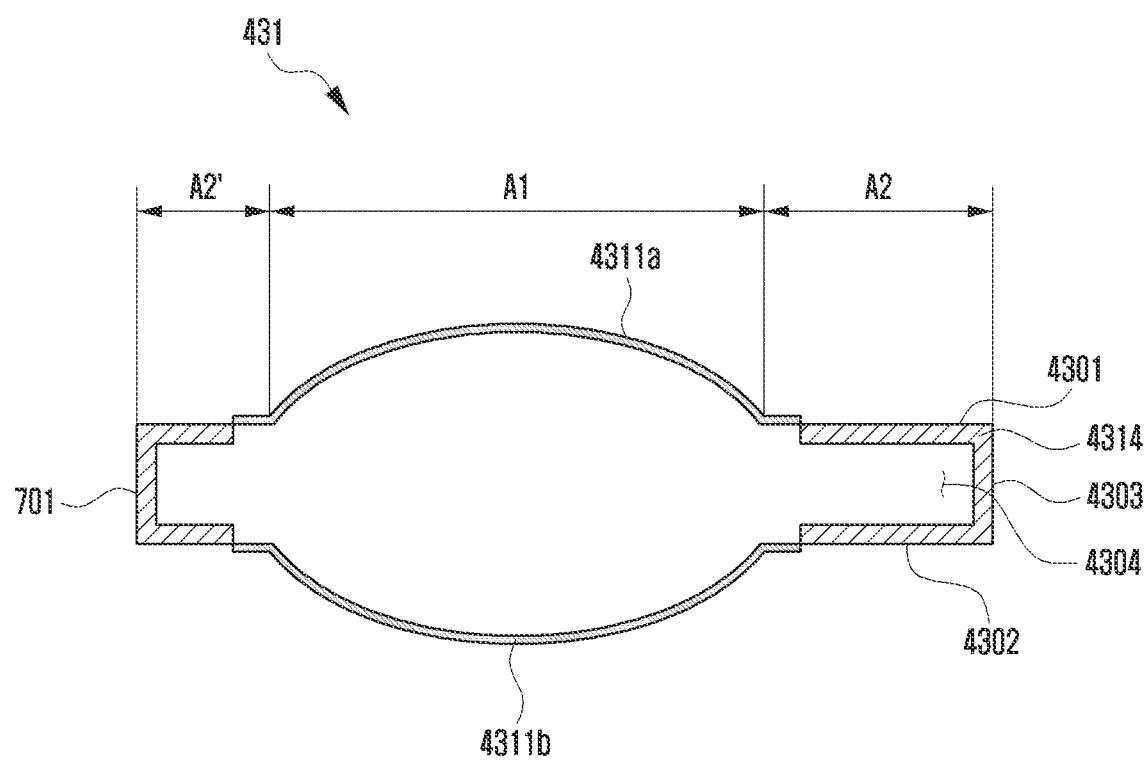
FIG. 7F is a view illustrating a cross-sectional structure of a lens according to an embodiment of the disclosure.

FIG. 7F is a view illustrating a cross-sectional structure of a lens according to an embodiment of the disclosure.

Figure 7G:
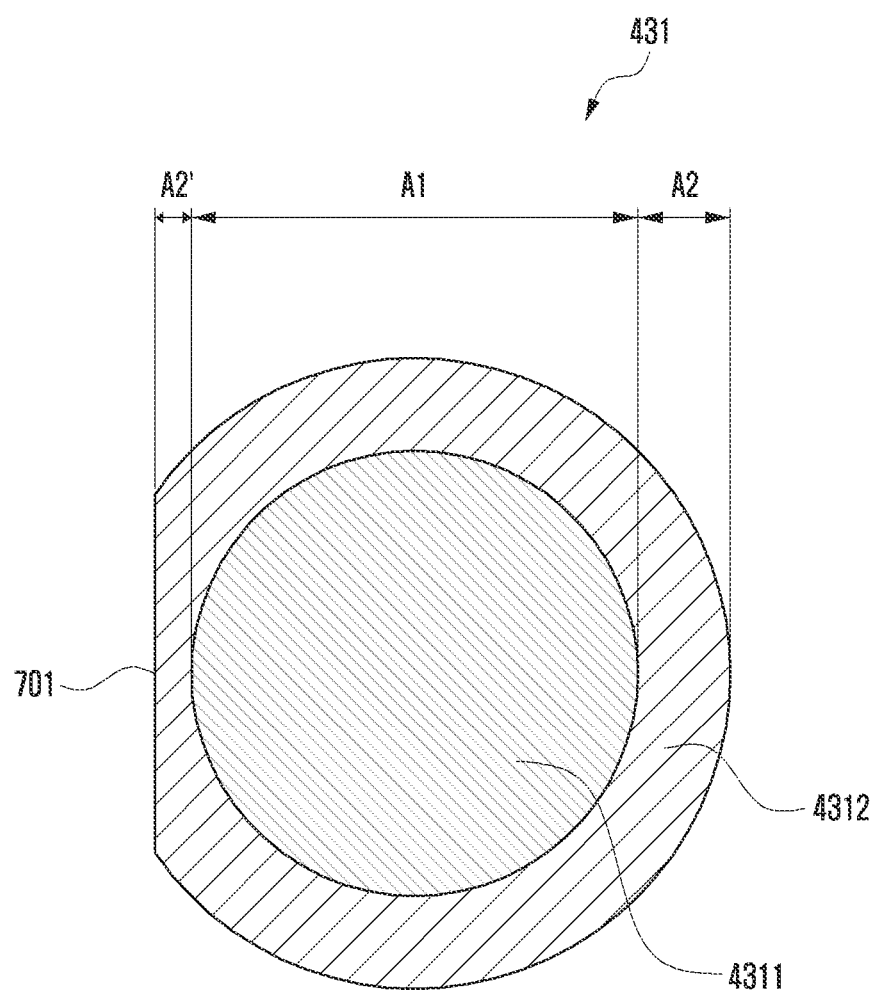
FIG. 7G is a view illustrating a cross-sectional structure of a lens according to an embodiment of the disclosure.

FIG. 7G is a view illustrating a cross-sectional structure of a lens according to an embodiment of the disclosure.

Referring to FIGS. 7F and 7G, the light absorbing layer 4312 may be formed to include a plane section 701 formed in a partial area A2' of the second area (e.g., ineffective area) due to a gate cutting process on the lens side surface.

Figure 8A:
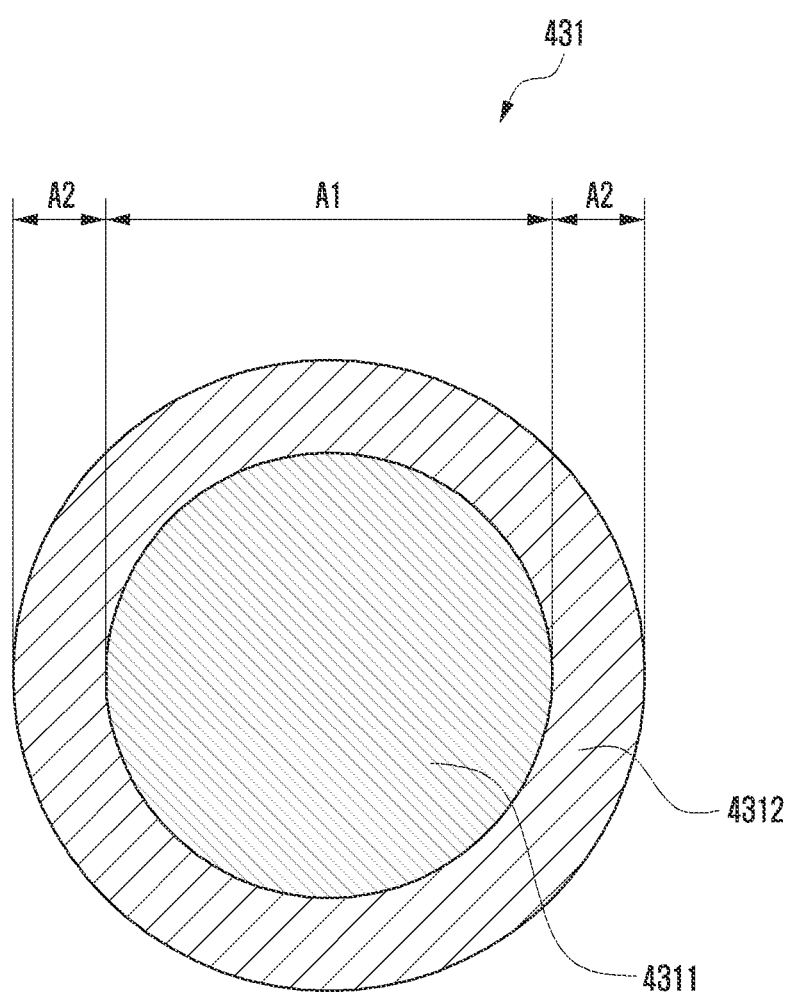
FIG. 8A is a plan view of a lens illustrating various shapes of a first area through a second area according to an embodiment of the disclosure.
Figure 8B:
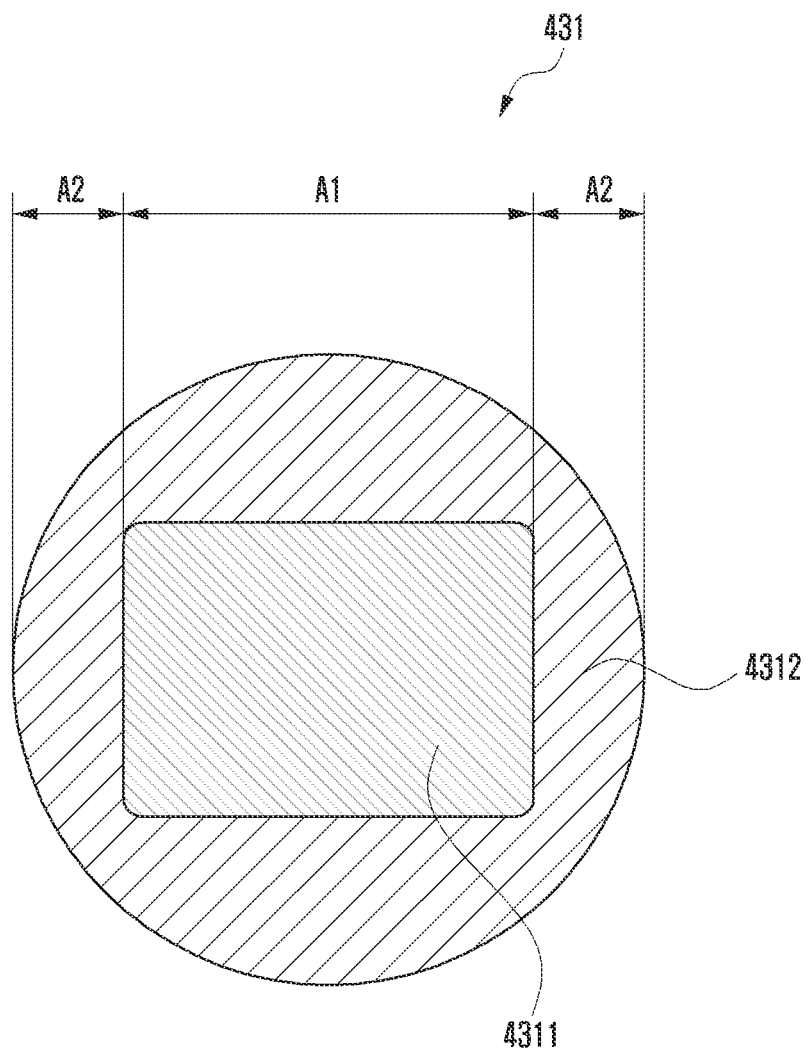
FIG. 8B is a plan view of a lens illustrating various shapes of a first area through a second area according to an embodiment of the disclosure.

FIGS. 8A and 8B are plan views of a lens illustrating various shapes of a first area A1 through a second area A2 (e.g., ineffective area) according to various embodiments of the disclosure.

Although the lens 431 of FIGS. 8A and 8B is illustrated and described as one of the plurality of lenses 430 of FIG. 4, it is not limited thereto. For example, the lens 431 of FIGS. 8A and 8B may be replaced by at least one of a plurality of remaining lenses 432, 433, and 434 of FIG. 4.

According to various embodiments, the shape of the anti-reflection coating layer 4311 may be variously determined through the light absorbing layer 4312.

Referring to FIG. 8A, the anti-reflection coating layer 4311 may be formed in a circle through the light absorbing layer 4312 when the lens 431 is viewed from above. For example, the shape of the light absorbing layer 4312 may be variously determined through the anti-reflection coating layer 4311.

Referring to FIG. 8B, the anti-reflection coating layer 4311 may be formed in a rectangular shape (e.g., rectangular or square shape) through the light absorbing layer 4312 when the lens 431 is viewed from above. According to an embodiment, an area of the light absorbing layer 4312 may be increased through the anti-reflection coating layer 4311 of the rectangular shape, and thus it may help suppression of the inner reflection. As another embodiment, the anti-reflection coating layer 4311 may be formed to have a polygonal or elliptical shape through the light absorbing layer 4312 when the lens 431 is viewed from above. As another embodiment, the anti-reflection coating layer 4311 may be formed in a shape corresponding to the shape of the image sensor (e.g., image sensor 440 of FIG. 4) disposed to have the same center as the lens center when the lens 431 is viewed from above.

Figure 9:
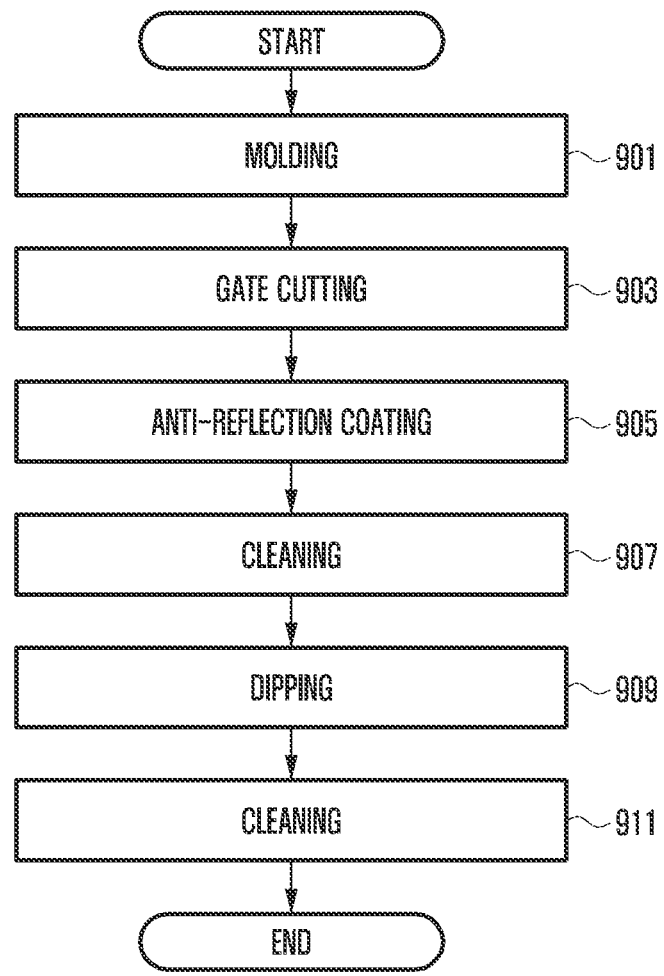
FIG. 9 is a process chart illustrating the order of manufacturing a lens according to an embodiment of the disclosure.

FIG. 9 is a process chart illustrating the order of manufacturing a lens according to an embodiment of the disclosure.

Figure 10:
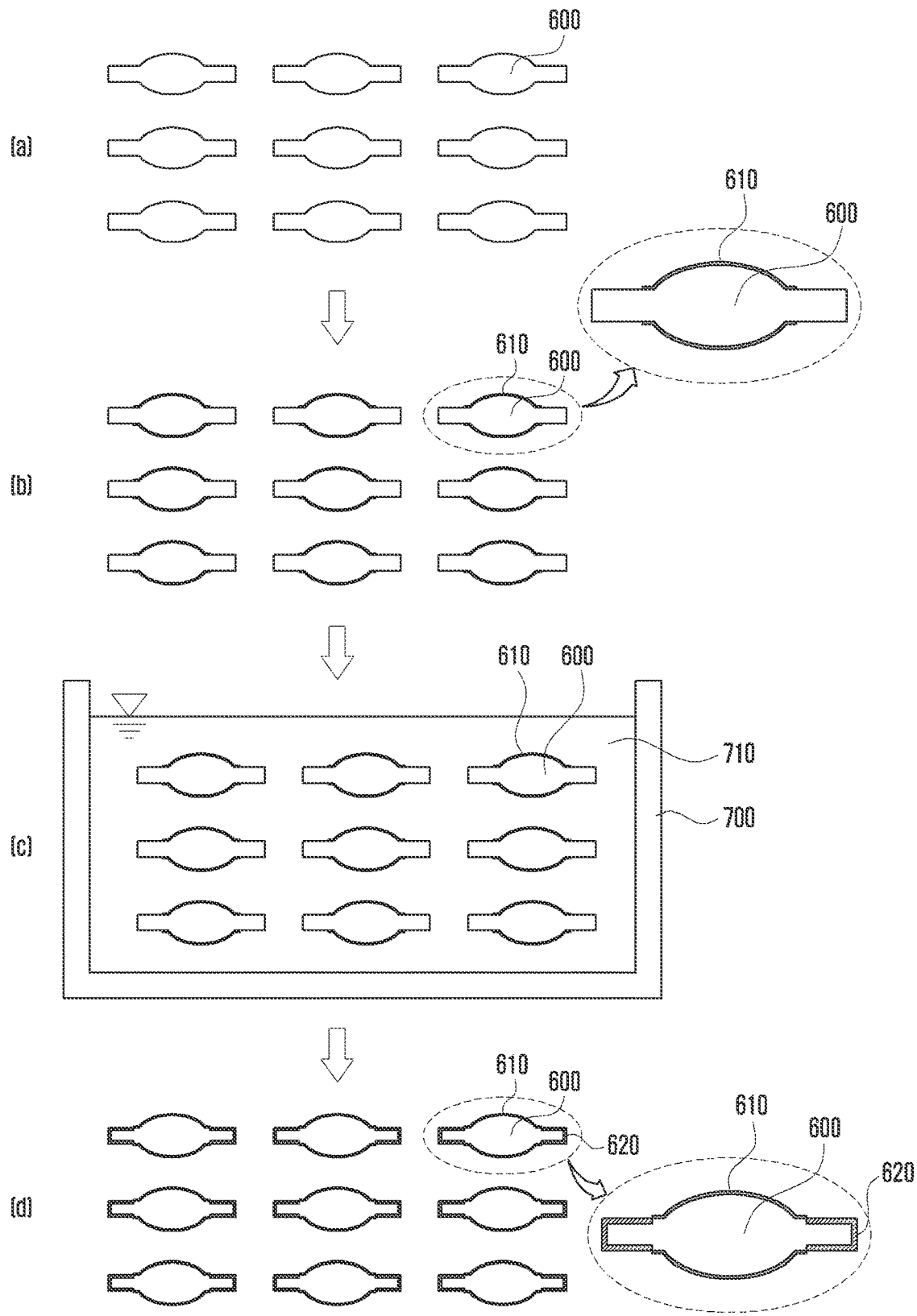
FIG. 10 is a schematic diagram according to the process chart of FIG. 9 according to an embodiment of the disclosure.

FIG. 10 is a schematic diagram according to the process chart of FIG. 9 according to an embodiment of the disclosure.

Referring to FIGS. 9 and 10, at operations 901 and 903, a plurality of lens base materials 600 may be formed through a molding process and a gate cutting process. As illustrated in (a) of FIG. 10, the lens base material 600 formed through the molding process 901 and the gate cutting process 903 may be formed in a shape being divided into the first area A1 (e.g., effective area) and a second area A2 (e.g., ineffective area) illustrated in FIG. 5. According to an embodiment, a polymer material may include polyethylene (PE), [carbon polymer composite (CPC)], cyclo olefin polymer (COP), cyclo olefin co-polymer (COC), poly methyl methacrylate (PMMA), or polycarbonate (PC).

At operations 905 and 907, for the plurality of lens base materials 600, with reference to (b) of FIG. 10, the anti-reflection coating layer 610 (e.g., anti-reflection coating layer 4311 of FIG. 5) may be formed on parts of the first area A1 and the second area A2, and may be cleaned. According to an embodiment, the anti-reflection coating layer 610 may be formed through the deposition process using $SiO_2$, $TiO_2$, or $ZrO_2$. As illustrated in FIG. 5, the anti-reflection coating layer 610 may be formed on the first surface (e.g., first surface 4301 of FIG. 5) and the second surface (e.g., second surface 4302 of FIG. 5) in the first area (e.g., first area A1 of FIG. 5) of the lens base material 600. As another embodiment, the anti-reflection coating layer 610 may be formed only on the first area (e.g., first area A1 of FIG. 5) of the lens base material 600.

At operation 909, for the lens base materials 600 having been cleaned, with reference to (c) of FIG. 10, the dipping or immersion process may be performed, in which the second area (e.g., second area A2 of FIG. 5) is colored through a coloring liquid (e.g., dyeing liquid) 710. In this case, the lens base materials may be immersed into a coloring tank 700 (e.g., dyeing tank) in which the coloring liquid 710 prepared with a coloring condition of a predetermined temperature and a predetermined density through a coloring agent is dipped, and if a predetermined amount of time has elapsed, the second area (e.g., second area A2 of FIG. 5) of the lens base material 600 may be colored to have the light absorbing layer 620 (e.g., light absorbing layer 4312 of FIG. 5) through the coloring liquid 710.

At operation 911, the lens base materials 600 having been cleaned may be formed as the lenses 431 of FIG. 5, in which the anti-reflection coating layer 610 is exposed on the first area (e.g., first area A1 of FIG. 5), and the light absorbing layer 620 is formed on the second area (e.g., second area A2 of FIG. 5).

As another embodiment, although not illustrated, if the anti-reflection coating layer 610 is not included in the lens base material 600, parts of the first area (e.g., first area A1 of FIG. 5) and the second area (e.g., second area A2 of FIG. 5) of the lens corresponding to the anti-reflection coating layer may be preprocessed to form a hard coating layer (e.g., silicone resin layer), and after the light absorbing layer 620 is formed on the second area (e.g., second area A2 of FIG. 5) through the dipping, a lens having only the light absorbing layer 620 may be provided through peeling and cleaning processes for removing the hard coating layer so as to expose the parts of the first area (e.g., first area A1 of FIG. 5) and the second area (e.g., second area A2 of FIG. 5) of the lens base material 600 corresponding to the anti-reflection coating layer 610 through a peeling liquid again.

As another embodiment, after the process of peeling the hard coating layer in the above example, the reflectivity may be reduced by forming the anti-reflection coating layer on the parts of the first area A1 and the second area A2 again.

Figure 11:
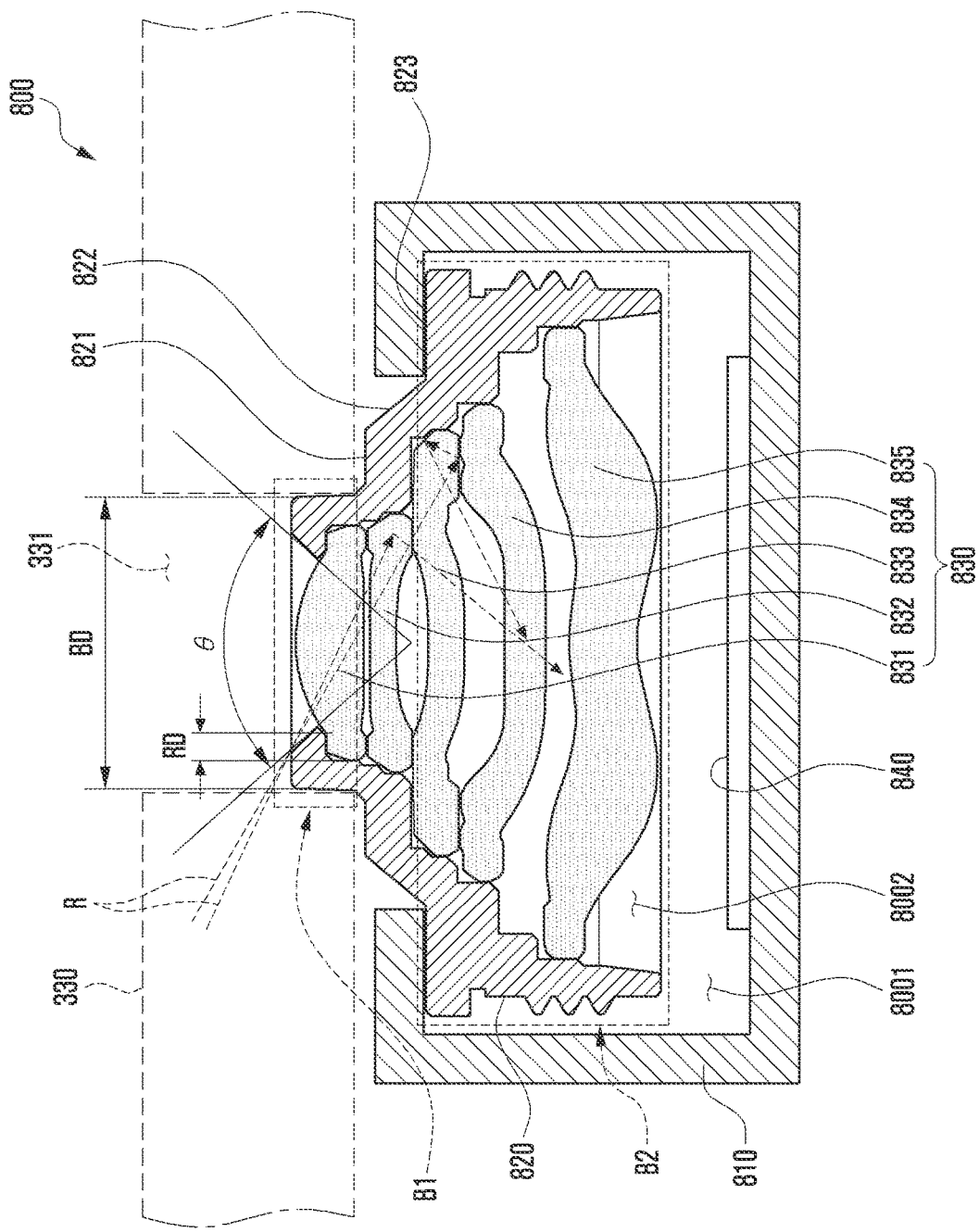
FIG. 11 is a cross-sectional view illustrating a configuration of a camera module according to an embodiment of the disclosure.

FIG. 11 is a cross-sectional view illustrating the configuration of a camera module according to an embodiment of the disclosure.

The camera module 800 of FIG. 11 may be similar to the camera module 400 of FIG. 4 at least partly, or may include other embodiments of the camera module.

Referring to FIG. 11, the camera module 800 (e.g., camera module 400 of FIG. 4) (e.g., camera device) may include a camera housing 810 (e.g., camera housing 410 of FIG. 4), a barrel member 820 (e.g., barrel member 420 of FIG. 4) (barrel) projecting at least partly from the camera housing 810, a plurality of lenses 830: 831, 832, 833, 834, and 835 (e.g., the plurality of lenses 430 of FIG. 4) disposed at predetermined intervals in the inner space 8002 of the barrel member 820, and/or at least one image sensor (e.g., image sensor 440 of FIG. 4) disposed so that the center thereof is aligned with the plurality of lenses 830 in the inner space 8001 of the camera housing 810. As another embodiment, the camera module 800 may not include the camera housing 810. In this case, the image sensor 840 may be disposed in the inner space 8002 of the barrel member 820.

According to various embodiments, in order to reduce the size of the second through-hole 331 of the display 330 as viewed from the outside, it may be advantageous that the overall diameter BD of an upper end portion B1 of the barrel member 820 is relatively smaller than that of a lower end portion B2 through at least one inclined portion 822 and step portions 821 and 823. For example, the upper end portion B1 of the barrel member 820 may be formed to have a relatively small diameter by reducing the size RD of the ineffective area (e.g., flange) of the lens in comparison to the effective area of the lens. In this case, due to the reduced size of the ineffective area, unintended inner reflection caused by a light inflow from the outside may occur through at least one of the plurality of lenses 830. Accordingly, the corresponding lens, in which the inner reflection occurs, may include the light absorbing layer (e.g., light absorbing layer 4312 of FIG. 5) formed through the dipping as described above in the ineffective area.

In an embodiment of the disclosure, in order to prevent the inner reflection occurring due to the reduced ineffective area (e.g., flange) of the lens, at least one lens, in which the light absorbing layer should be included through the dipping, may be determined. For example, the lens, to which the light absorbing layer by the dipping is applied, may be determined as at least one lens, in which the light (e.g., light source) incident from the outside with an angle that is larger than the viewing angle θ of the plurality of lenses 830 arrives at the ineffective area (e.g., flange).

For example, in case of the lens having the viewing angle θ of 80 degrees, if the light incident with an incident angle (e.g., 41 to 80 degrees) that is larger than the half viewing angle D-FOV is incident to the ineffective area (e.g., flange) of the corresponding lens, it may be necessary to apply the dipping for forming the light absorbing layer. According to an embodiment, because the viewing angle θ of the camera module 800 is determined by the lens focal length EFL and the image sensor size (e.g., diagonal length), the incident ray of light that is larger than tan−1((image sensor size/2)/EFL) generates flare, and thus the light absorbing layer through the dipping may be applied.

FIGS. 12A to 12G are plan views of lenses including an anti-reflection coating layer and a light absorbing layer according to various embodiments of the disclosure.

Lenses 210, 220, 230, 240, 250, 260, and 270 illustrated in FIGS. 12A to 12G may be at least partly similar to at least one of the plurality of lenses 430 of FIG. 4 and/or at least one of the plurality of lenses 830 of FIG. 11, or may further include other embodiments of the lenses.

According to various embodiments, the lenses 210, 220, 230, 240, 250, 260, and 270 including anti-reflection coating layers 211, 221, 231, 241, 251, 261, and 271 and/or light absorbing layers 212, 222, 232, 242, 252, 262, and 272 may have various shapes through the light absorbing layers 212, 222, 232, 242, 252, 262, and 272 to be formed through the dipping regardless of the shape or size thereof. Further, in explaining the drawings below, it is apparent that the permeability of the anti-reflection coating layers 211, 221, 231, 241, 251, 261, and 271 is higher than the permeability of the light absorbing layers 212, 222, 232, 242, 252, 262, and 272.

Figure 12A:
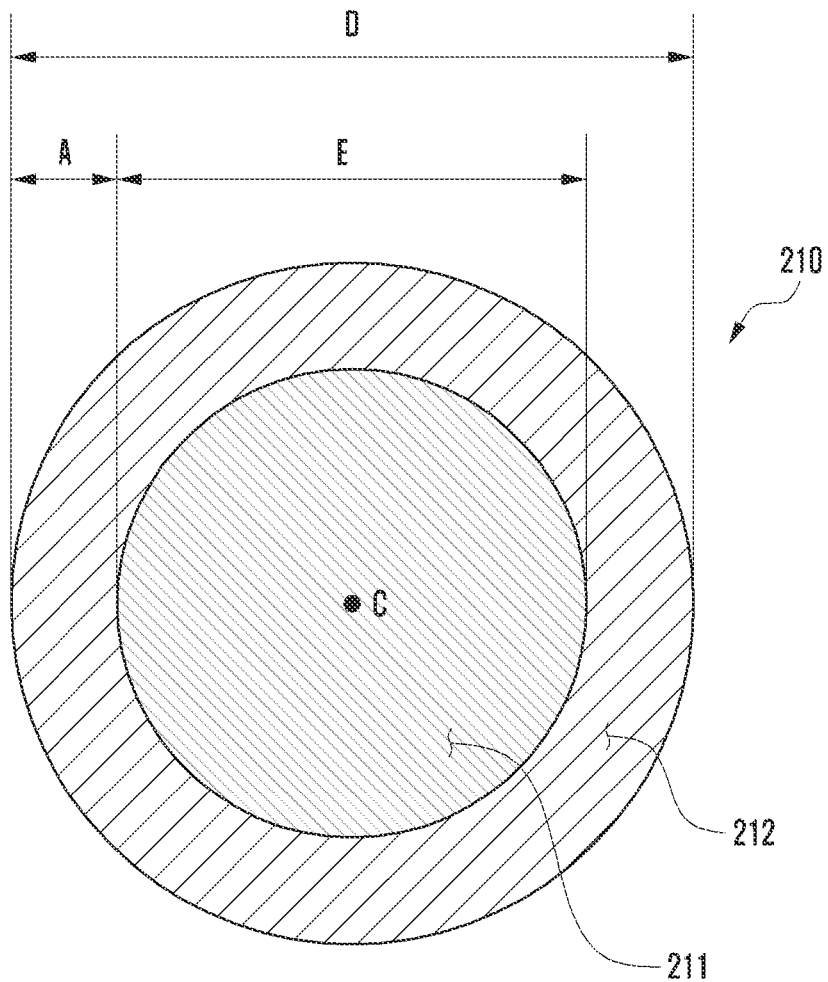
FIG. 12A is a plan view of lenses including an anti-reflection coating layer and a light absorbing layer according to an embodiment of the disclosure.

FIG. 12A is a plan view of lenses including an anti-reflection coating layer and a light absorbing layer according to an embodiment of the disclosure.

Referring to FIG. 12A, the lens 210 may include the anti-reflection coating layer 211 (e.g., effective area) and the light absorbing layer 212 (e.g., ineffective area) formed to surround the anti-reflection coating layer 211. According to an embodiment, the anti-reflection coating layer 211 may be formed in a circular shape, and the light absorbing layer 212 may have the same center C as the anti-reflection coating layer 211, and may be formed in a circular shape that is larger than that of the anti-reflection coating layer 211.

According to various embodiments, the lens 210 may be formed so that the maximum length E of the anti-reflection coating layer 211 passing through the center C is smaller than the outer diameter D of the lens 210. According to an embodiment, the lens 210 may be formed so that the maximum length A (e.g., distance from the anti-reflection coating layer to the lens end portion) of the light absorbing layer 212 does not exceed 0.7 mm. According to an embodiment, the lens 210 may be formed so that the ratio (A/D) of the maximum distance A of the light absorbing layer 212 to the outer diameter D of the lens 210 does not exceed 0.3.

Figure 12B:
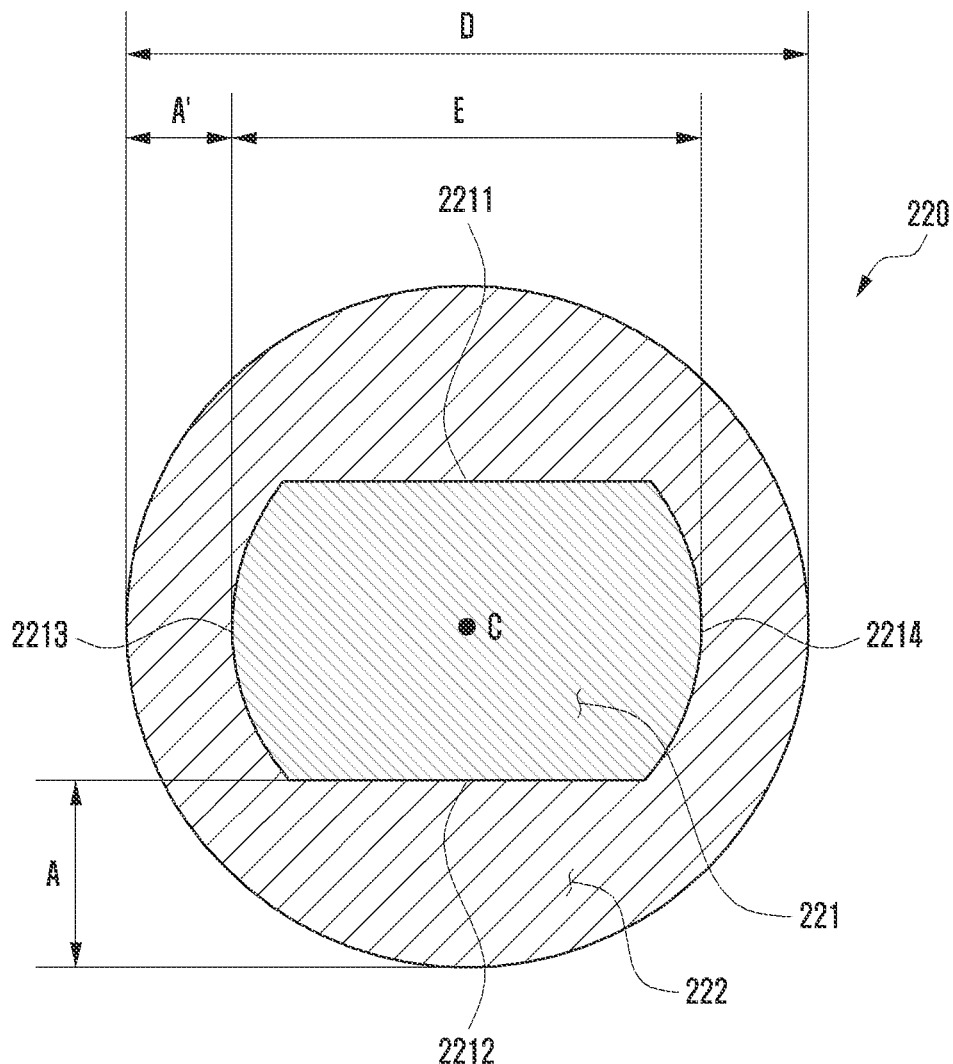
FIG. 12B is a plan view of lenses including an anti-reflection coating layer and a light absorbing layer according to an embodiment of the disclosure.

FIG. 12B is a plan view of lenses including an anti-reflection coating layer and a light absorbing layer according to an embodiment of the disclosure.

Referring to FIG. 12B, the lens 220 may include the anti-reflection coating layer 221 (e.g., effective area) and the light absorbing layer 222 (e.g., ineffective area) formed to surround the anti-reflection coating layer 221. According to an embodiment, the anti-reflection coating layer 221 may include two facing straight portions 2211 and 2212 and two curved portions 2213 and 2214 connecting both ends of the two straight portions 2211 and 2212. According to an embodiment, the two curved portions 2213 and 2214 of the anti-reflection coating layer 221 may be formed to have the same curvature as or a different curvature from that of the light absorbing layer 222.

According to various embodiments, the lens 220 may be formed so that the light absorbing layer 222 has the maximum length A (e.g., distance from the straight portion 2212 to the lens end portion) and the minimum length A' (e.g., distance from the curved portion 2213 to the lens end portion). According to an embodiment, the lens 220 may be formed so that the maximum length E of the anti-reflection coating layer 221 passing through the center C is smaller than the outer diameter D of the lens 220. According to an embodiment, the lens 220 may be formed so that the minimum length A' (e.g., minimum distance from the anti-reflection coating layer to the lens end portion) of the light absorbing layer 222 does not exceed 0.7 mm. According to an embodiment, the lens 220 may be formed so that the ratio (A'/D) of the minimum length A' of the light absorbing layer 222 to the outer diameter D of the lens 220 does not exceed 0.3.

Figure 12C:
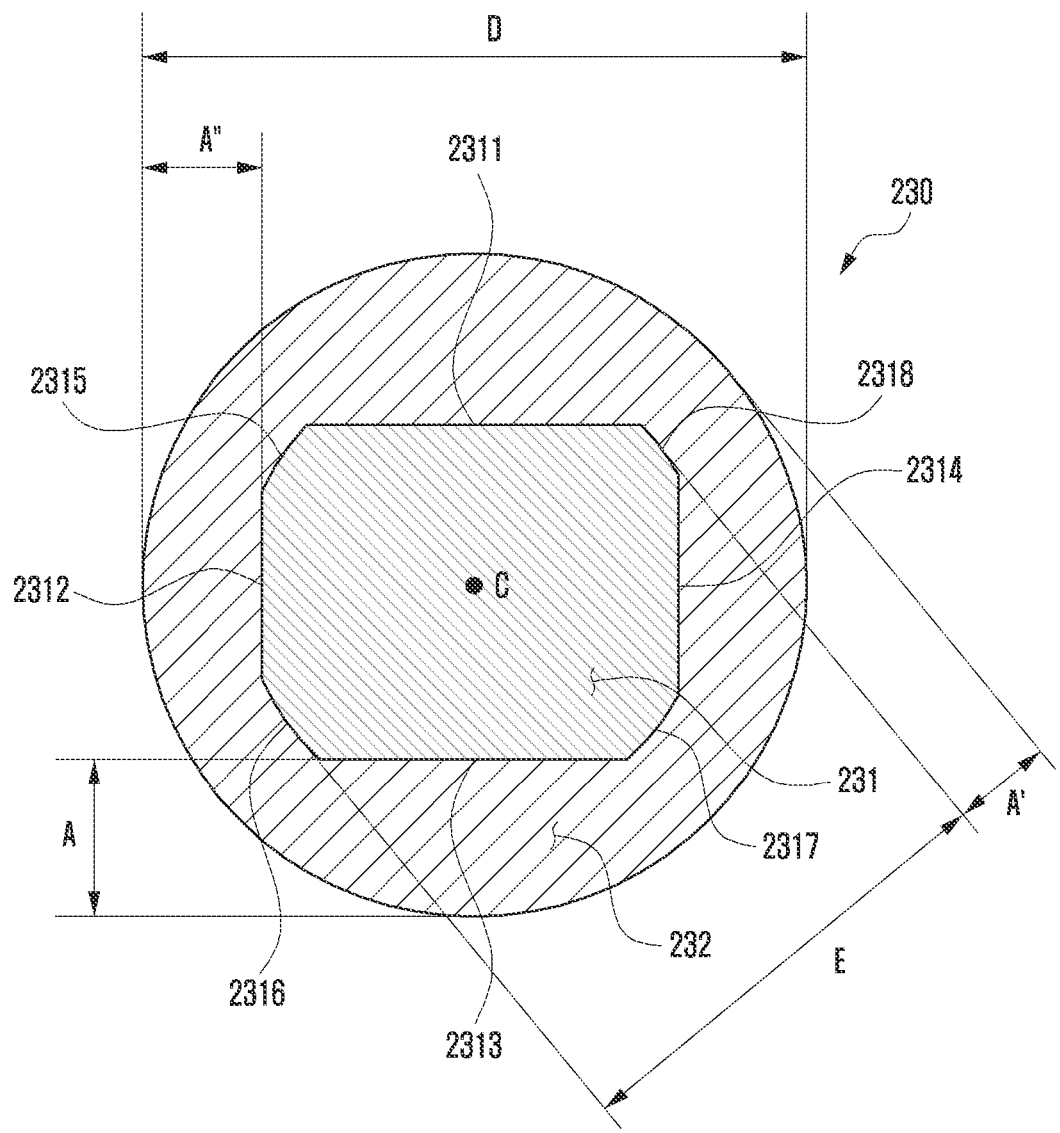
FIG. 12C is a plan view of lenses including an anti-reflection coating layer and a light absorbing layer according to an embodiment of the disclosure.

FIG. 12C is a plan view of lenses including an anti-reflection coating layer and a light absorbing layer according to an embodiment of the disclosure.

Referring to FIG. 12C, the lens 230 may include the anti-reflection coating layer 231 (e.g., effective area) and the light absorbing layer 232 (e.g., ineffective area) formed to surround the anti-reflection coating layer 231. According to an embodiment, the anti-reflection coating layer 231 may be formed substantially in a rectangular shape through four straight portions 2311, 2312, 2313, and 2314, and may include cutting portions 2315, 2316, 2317, and 2318 connecting the straight portions 2311, 2312, 2313, and 2314 at corner portions where the respective straight portions 2311, 2312, 2313, and 2314 meet together. According to an embodiment, the cutting portions 2315, 2316, 2317, and 2318 may be formed in a curve or in a straight line. According to an embodiment, the cutting portions 2315, 2316, 2317, and 2318 of the anti-reflection coating layer 231 may be formed to have the same curvature as or a different curvature from that of the light absorbing layer 232.

According to various embodiments, the lens 230 may be formed so that the light absorbing layer 232 has the maximum length A (e.g., distance from the straight portion 2313 to the lens end portion), the middle length A" (e.g., distance from the straight portion 2312 to the lens end portion), and the minimum length A' (e.g., distance from the cutting portion 2318 to the lens end portion). In a certain embodiment, the maximum length A and the middle length A" may be the same or may be changed to each other. According to an embodiment, the lens 230 may be formed so that the maximum length E of the anti-reflection coating layer 231 passing through the center C is smaller than the outer diameter D of the lens 230. According to an embodiment, the lens 230 may be formed so that the minimum length A' (e.g., minimum distance from the anti-reflection coating layer 231 to the lens end portion) of the light absorbing layer 232 does not exceed 0.7 mm. According to an embodiment, the lens 230 may be formed so that the ratio (A'/D) of the minimum length A' of the light absorbing layer 232 to the outer diameter D of the lens 230 does not exceed 0.3.

Figure 12D:
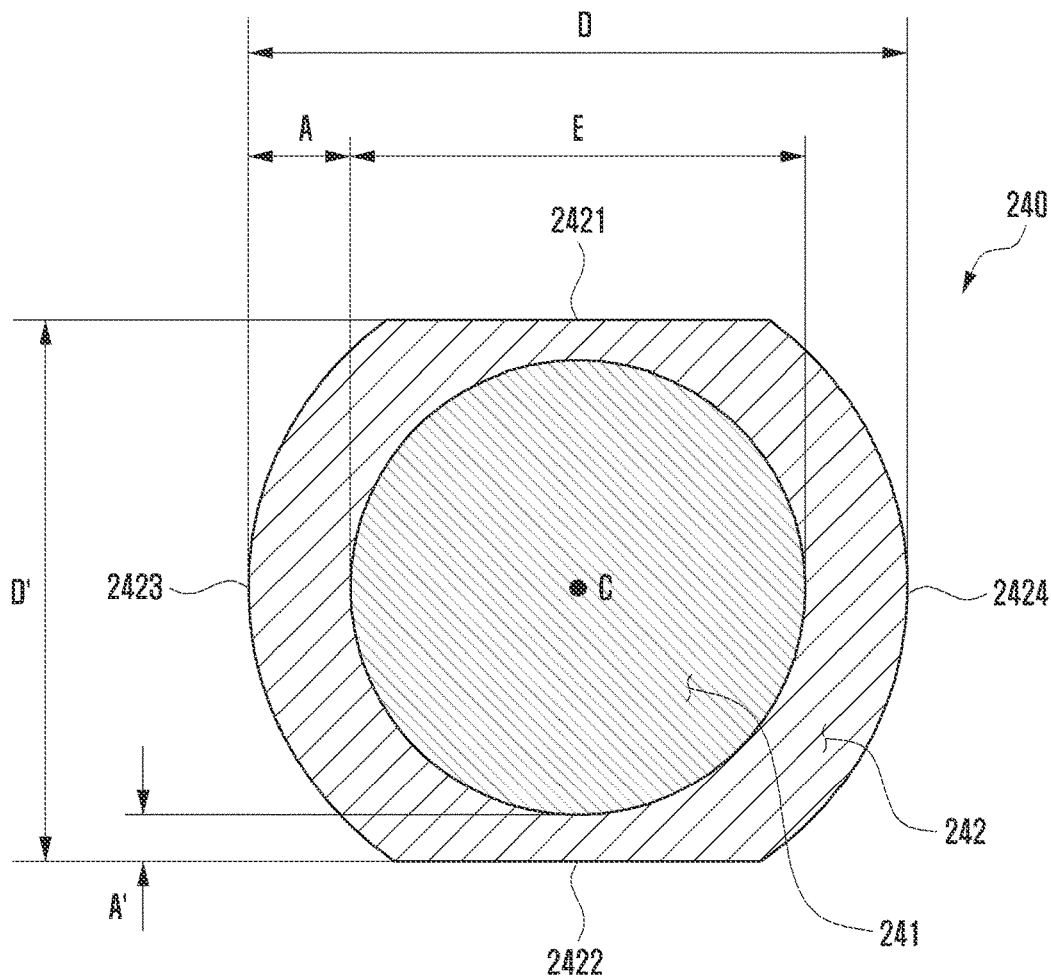
FIG. 12D is a plan view of lenses including an anti-reflection coating layer and a light absorbing layer according to an embodiment of the disclosure.

FIG. 12D is a plan view of lenses including an anti-reflection coating layer and a light absorbing layer according to an embodiment of the disclosure.

Referring to FIG. 12D, the lens 240 may include the anti-reflection coating layer 241 (e.g., effective area) and the light absorbing layer 242 (e.g., ineffective area) formed to surround the anti-reflection coating layer 241. According to an embodiment, the anti-reflection coating layer 241 may be formed in a circular shape. According to an embodiment, the light absorbing layer 242 may include two facing straight portions 2421 and 2422 and two curved portions 2423 and 2424 connecting both ends of the two straight portions 2421 and 2422. According to an embodiment, the two curved portions 2423 and 2424 of the light absorbing layer 242 may be formed to have the same curvature as or a different curvature from that of the anti-reflection coating layer 241.

According to various embodiments, the lens 240 may be formed so that the light absorbing layer 242 has the maximum length A (e.g., distance from the anti-reflection coating layer 241 to the curved portion 2423) and the minimum length A' (e.g., distance from the anti-reflection coating layer 241 to the straight portion 2422). According to an embodiment, the lens 240 may be formed to have the maximum outer diameter D (e.g., distance between the curved portions) and the minimum outer diameter D' (e.g., distance between the straight portions). According to an embodiment, the lens 240 may be formed so that the maximum length E of the anti-reflection coating layer 241 passing through the center C is smaller than the minimum outer diameter D' of the lens 240. According to an embodiment, the lens 240 may be formed so that the minimum length A' (e.g., minimum distance from the anti-reflection coating layer 241 to the lens end portion) of the light absorbing layer 242 does not exceed 0.7 mm. According to an embodiment, the lens 240 may be formed so that the ratio (A'/D') of the minimum length A' of the light absorbing layer 242 to the minimum outer diameter D' of the lens 240 does not exceed 0.3. According to an embodiment, the lens 240 may be formed so that the ratio (A/D) of the maximum length A of the light absorbing layer 242 to the maximum outer diameter D of the lens 240 does not exceed 0.3.

Figure 12E:
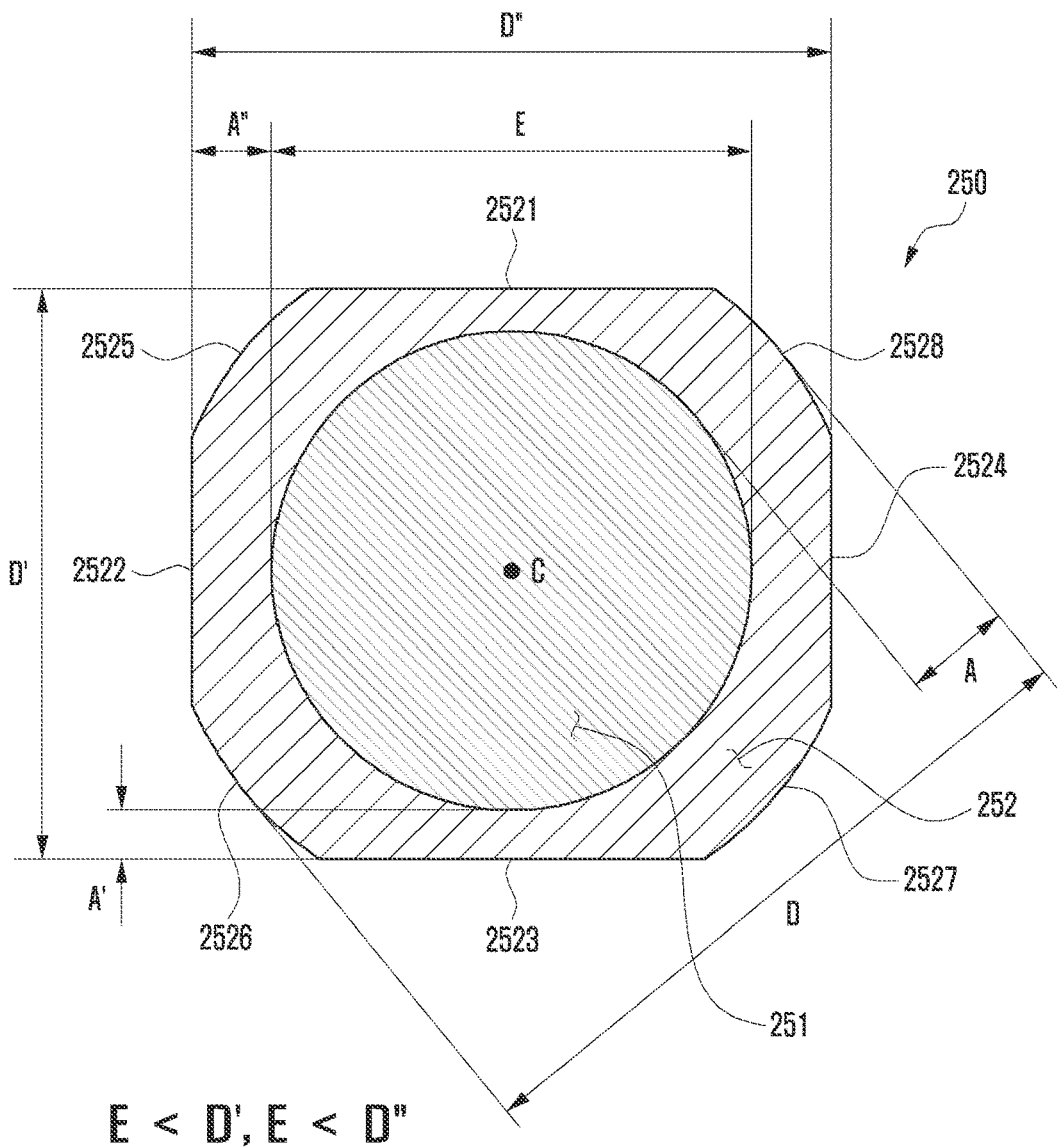
FIG. 12E is a plan view of lenses including an anti-reflection coating layer and a light absorbing layer according to an embodiment of the disclosure.

FIG. 12E is a plan view of lenses including an anti-reflection coating layer and a light absorbing layer according to an embodiment of the disclosure.

Referring to FIG. 12E, the lens 250 may include the anti-reflection coating layer 251 (e.g., effective area) and the light absorbing layer 252 (e.g., ineffective area) formed to surround the anti-reflection coating layer 251. According to an embodiment, the anti-reflection coating layer 251 may be formed in a circular shape. According to an embodiment, the light absorbing layer 252 may be formed substantially in a rectangular shape through four straight portions 2521, 2522, 2523, and 2524, and may include cutting portions 2525, 2526, 2527, and 2528 connecting the straight portions 2521, 2522, 2523, and 2524 at corner portions where the respective straight portions 2521, 2522, 2523, and 2524 meet together. According to an embodiment, the cutting portions 2525, 2526, 2527, and 2528 may be formed in a curve or in a straight line. According to an embodiment, the cutting portions 2525, 2526, 2527, and 2528 of the light absorbing layer 252 may be formed to have the same curvature as or a different curvature from that of the anti-reflection coating layer 251.

According to various embodiments, the lens 250 may be formed so that the light absorbing layer 252 has the maximum length A (e.g., distance from the anti-reflection coating layer 251 to the cutting portion 25528), the middle length A" (e.g., distance from the anti-reflection coating layer 251 to the first straight portion 2522), and the minimum length A' (e.g., distance from the anti-reflection coating layer 251 to the second straight portion 2523). According to an embodiment, the lens 250 may be formed to have the maximum outer diameter D (e.g., distance between the cutting portions 2526 and 2528), the middle outer diameter D" (e.g., distance between the straight portions 2522 and 2524), and the minimum outer diameter D' (e.g., distance between the straight portions 2521 and 2523). According to an embodiment, the lens 250 may be formed so that the maximum length E of the anti-reflection coating layer 251 passing through the center C is smaller than the minimum outer diameter D' of the lens 250. According to an embodiment, the lens 250 may be formed so that the minimum length A' (e.g., minimum distance from the anti-reflection coating layer 251 to the lens end portion) of the light absorbing layer 252 does not exceed 0.7 mm. According to an embodiment, the lens 250 may be formed so that the ratio (A'/D') of the minimum length A' of the light absorbing layer 252 to the minimum outer diameter D' of the lens 250 does not exceed 0.3. According to an embodiment, the lens 250 may be formed so that the ratio (A/D) of the maximum length A of the light absorbing layer 252 to the maximum outer diameter D of the lens 250 does not exceed 0.3.

Figure 12F:
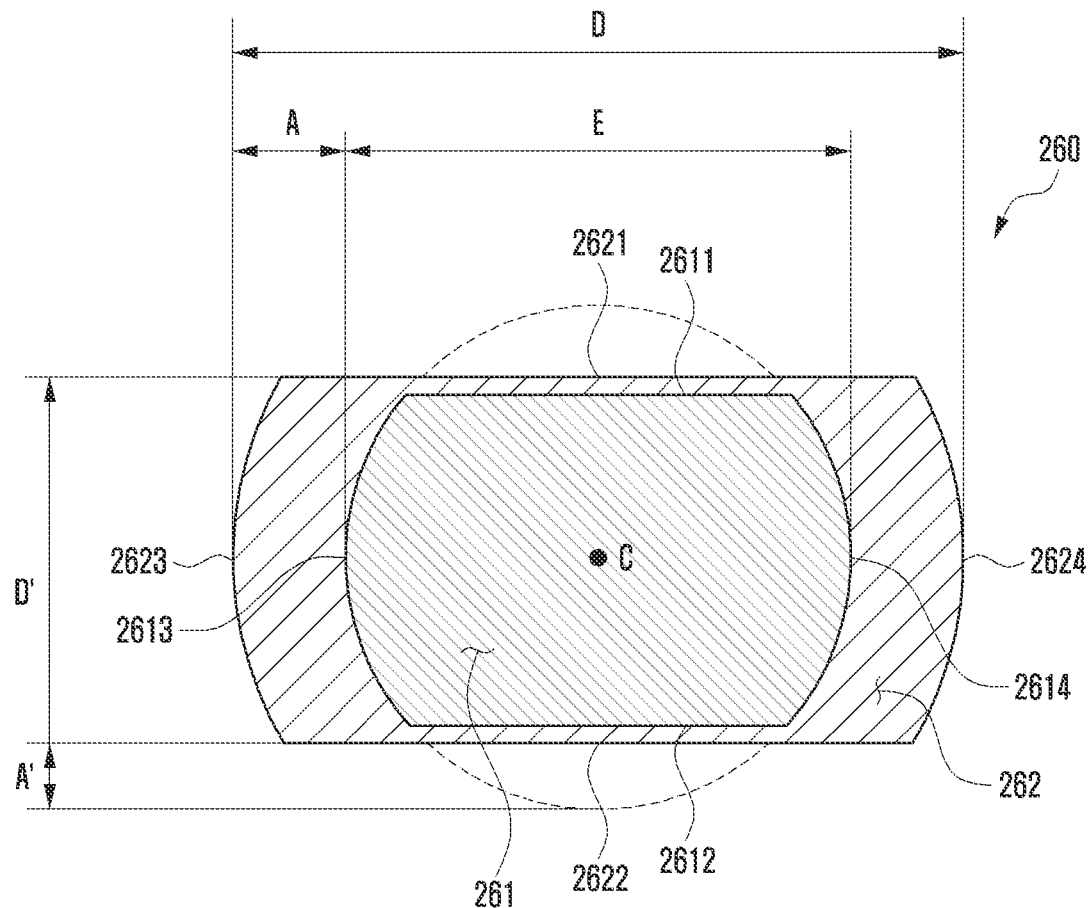
FIG. 12F is a plan view of lenses including an anti-reflection coating layer and a light absorbing layer according to an embodiment of the disclosure.

FIG. 12F is a plan view of lenses including an anti-reflection coating layer and a light absorbing layer according to an embodiment of the disclosure.

Referring to FIG. 12F, the lens 260 may include the anti-reflection coating layer 261 (e.g., effective area) and the light absorbing layer 262 (e.g., ineffective area) formed to surround the anti-reflection coating layer 261. For example, the lens 260 may be formed through cutting of at least a part of the lens 210 of FIG. 12A up to a part of the anti-reflection coating layer 211. According to an embodiment, the anti-reflection coating layer 261 may include two facing straight portions 2611 and 2612 and two curved portions 2613 and 2614 connecting both ends of the two straight portions 2611 and 2612. According to an embodiment, the light absorbing layer 262 may include two facing straight portions 2621 and 2622 and two curved portions 2623 and 2624 connecting both ends of the two straight portions 2621 and 2622. According to an embodiment, the two curved portions 2613 and 2614 of the anti-reflection coating layer 261 and the two curved portions 2623 and 2624 of the light absorbing layer 262 may be disposed to face each other, and may be formed to have the same curvature or different curvatures. Accordingly, the lens 260 may be formed to have the light absorbing layer 262 through the curved portions 2623 and 2624 in the area facing the curved portions 2613 and 2614 of the anti-reflection coating layer 261, and may not substantially have the light absorbing layer in the area facing the straight portions 2611 and 2612 of the anti-reflection coating layer 261. For example, the straight portions 2621 and 2622 of the light absorbing layer 262 facing the straight portions 2611 and 2612 of the anti-reflection coating layer 261 may include dye layers dipped from the anti-reflection coating layer 261 to side surfaces of the lens.

According to various embodiments, the lens 260 may be formed so that the light absorbing layer 262 has the maximum length A (e.g., distance from the curved portion 2613 of the anti-reflection coating layer 261 to the curved portion 2623 of the light absorbing layer) and the minimum length −A' (e.g., distance removed through cutting from the circular anti-reflection coating layer 261 to the straight portion 2622). According to an embodiment, the lens 260 may be formed to have the maximum outer diameter D (e.g., distance between the curved portions 2623 and 2624) and the minimum outer diameter D' (e.g., distance between the straight portions 2621 and 2622). According to an embodiment, the lens 260 may be formed so that the maximum length E of the anti-reflection coating layer 261 passing through the center C is larger than the minimum outer diameter D' of the lens 260. According to an embodiment, the lens 260 may be formed so that an absolute value of the minimum length −A' (e.g., minimum distance from the anti-reflection coating layer 261 to the lens end portion removed through cutting) of the light absorbing layer 262 does not exceed 0.25 multiple of the maximum length E of the anti-reflection coating layer 261. According to an embodiment, the lens 260 may be formed so that the ratio (A/D) of the maximum length A of the light absorbing layer 262 to the maximum outer diameter D of the lens 260 does not exceed 0.3.

Figure 12G:
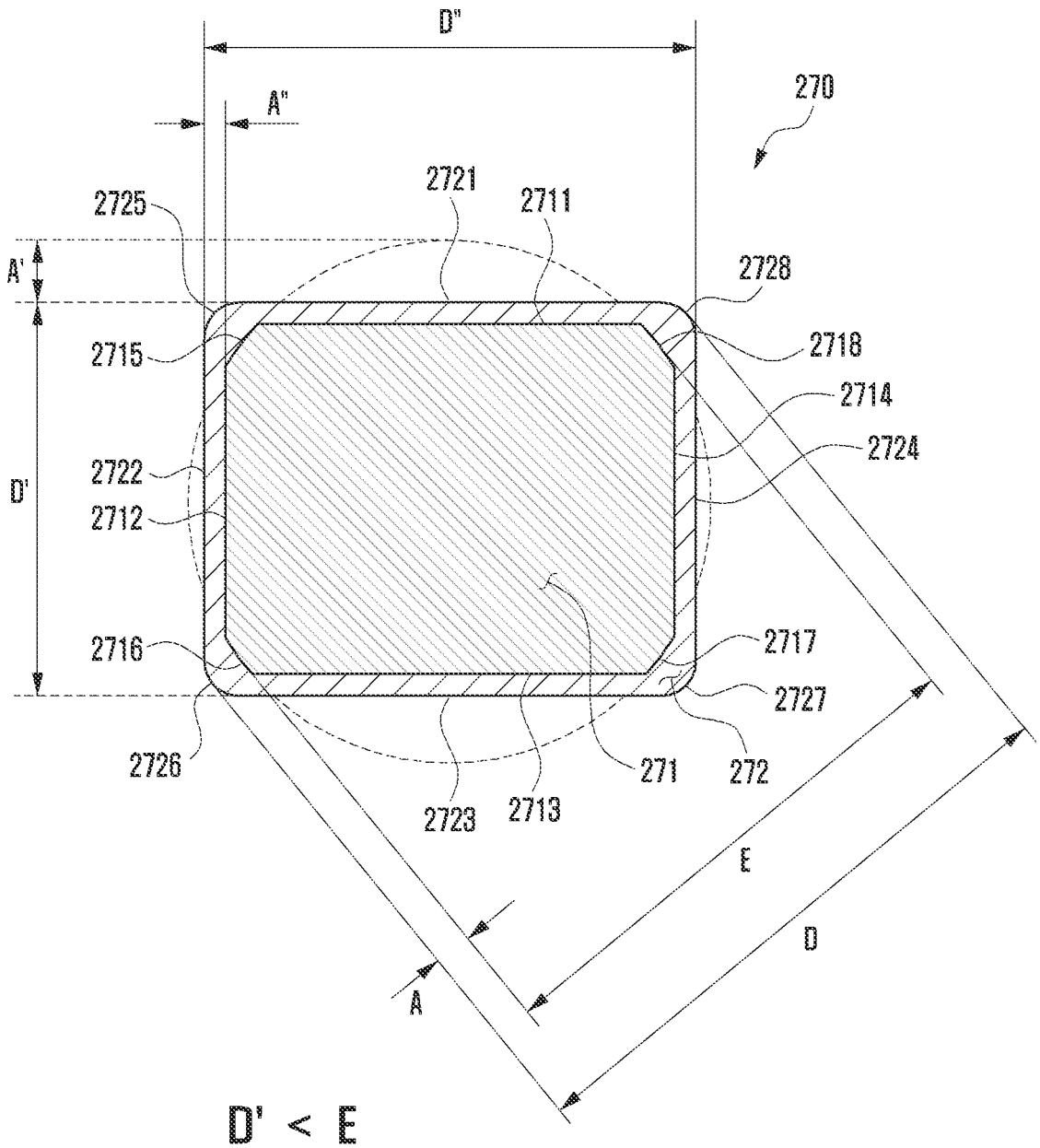
FIG. 12G is a plan view of lenses including an anti-reflection coating layer and a light absorbing layer according to an embodiment of the disclosure.

FIG. 12G is a plan view of lenses including an anti-reflection coating layer and a light absorbing layer according to an embodiment of the disclosure.

Referring to FIG. 12G, the lens 270 may include the anti-reflection coating layer 271 (e.g., effective area) and the light absorbing layer 272 (e.g., ineffective area) formed to surround only a part of the anti-reflection coating layer 271. According to an embodiment, the anti-reflection coating layer 271 may be formed substantially in a rectangular shape through four straight portions 2711, 2712, 2713, and 2714, and may include cutting portions 2715, 2716, 2717, and 2718 connecting the straight portions 2711, 2712, 2713, and 2714 at corner portions where the respective straight portions 2711, 2712, 2713, and 2714 meet together. According to an embodiment, the cutting portions 2715, 2716, 2717, and 2718 may be formed in a curve or in a straight line. According to an embodiment, the light absorbing layer 272 may surround the anti-reflection coating layer 271, and may be formed to have four straight portions 2721, 2722, 2723, and 2724 being substantially in a rectangular shape. According to an embodiment, the lens 270 may be formed to have the light absorbing layer 272 at corners 2725, 2726, 2727, and 2728 where the four straight portions 2721, 2722, 2723, and 2724 of the light absorbing layer 272 meet each other in the area facing the cutting portions 2715, 2716, 2717, and 2718 of the anti-reflection coating layer 271, and may not substantially have the light absorbing layer 272 in the area facing the straight portions 2711, 2712, 2713, and 2714 of the anti-reflection coating layer 271. For example, the straight portions 2721, 2722, 2723, and 2724 of the light absorbing layer 272 facing the straight portions 2711, 2712, 2713, and 2714 of the anti-reflection coating layer 271 may include dye layers dipped from the anti-reflection coating layer 271 to side surfaces of the lens. According to an embodiment, the corners 2725, 2726, 2727, and 2728 of the light absorbing layer may be formed to have the same curvature as or a different curvature from that of the cutting portions 2715, 2716, 2717, and 2718 of the anti-reflection coating layer 271.

According to various embodiments, the lens 270 may be formed so that the light absorbing layer 272 has the maximum length A (e.g., distance from the cutting portion 2716 of the anti-reflection coating layer 271 to the corner where the two straight portions 2722 and 2723 of the light absorbing layer 272 meet each other), the middle distance A" (e.g., distance from the straight portion 2712 of the anti-reflection coating layer 271 to the straight portion 2722 of the light absorbing layer 272), and the minimum length −A' (e.g., distance removed through cutting from the circular anti-reflection coating layer 271 to the straight portion 2711). According to an embodiment, the lens 270 may be formed to have the maximum outer diameter D (e.g., distance from the first corner where the two straight portions 2711 and 2714 of the light absorbing layer 272 meet each other to the second corner where the remaining straight portions 2722 and 2723 meet each other), the middle outer diameter D" (e.g., distance between the two straight portions 2722 and 2724 forming short sides of the light absorbing layer 272), and the minimum outer diameter D' (e.g., distance between the two straight portions 2711 and 2713 forming long sides of the light absorbing layer 272). According to an embodiment, the lens 270 may be formed so that the maximum length E of the anti-reflection coating layer 271 passing through the center C is larger than the minimum outer diameter D' of the lens 270. According to an embodiment, the lens 270 may be formed so that an absolute value of the minimum length −A' (e.g., minimum distance from the anti-reflection coating layer 271 to the lens end portion removed through cutting) of the light absorbing layer 272 does not exceed 0.25 multiple of the maximum length E of the anti-reflection coating layer 271. According to an embodiment, the lens 270 may be formed so that the ratio (A/D) of the maximum length A of the light absorbing layer 272 to the maximum outer diameter D of the lens 270 does not exceed 0.3.

According to various embodiments of the disclosure, it is possible to form the light absorbing layer in the ineffective area without any complicated mold structure in a state that the shape of the ineffective area of the lens is not restricted, and thus it is helpful to provide a camera module having an improved image quality performance by effectively suppressing the inner reflection. Further, the lenses according to various embodiments of the disclosure can flexibly cope with the complicated lens support structure of the barrel member, and mass production becomes possible at low costs.

According to various embodiments, an electronic device (e.g., mobile electronic device 100 of FIG. 1) may include a housing (e.g., housing 110 of FIG. 1), and a camera module (e.g., camera module 400 of FIG. 4) disposed in an inner space of the housing (e.g., inner space 3001 of FIG. 4), wherein the camera module includes an image sensor (e.g., image sensor 440 of FIG. 4), and a plurality of lenses (e.g., plurality of lenses 430 of FIG. 4) aligned with the image sensor, and wherein at least one of the plurality of lenses may include a first area (e.g., first area A1 of FIG. 5) formed to transfer at least a part of an external light to the image sensor, and a second area (e.g., second area A2 of FIG. 5) including a light absorbing layer (e.g., light absorbing layer 4312 of FIG. 5) formed to absorb the at least a part of the external light and to penetrate from an outer surface of the lens into an inner space (e.g., inner space 4304 of FIG. 5) with a predetermined depth.

According to various embodiments, the electronic device may include an anti-reflection coating layer (e.g., anti-reflection coating layer 4311 of FIG. 5) formed in at least a part of the first area.

According to various embodiments, the anti-reflection coating layer may extend to a part of the second area.

According to various embodiments, the anti-reflection coating layer may be formed in a circle or a rectangle through the light absorbing layer when the at least one lens is viewed from above.

According to various embodiments, the anti-reflection coating layer may be formed in a shape corresponding to a shape of the image sensor through the light absorbing layer when the at least one lens is viewed from above.

According to various embodiments, the second area may be formed to surround at least a part of the first area.

According to various embodiments, the lens may include a first surface (e.g., first surface 4301 of FIG. 5), a second surface (e.g., second surface 4302 of FIG. 5) directed in an opposite direction to the first surface, and a lens side surface (e.g., lens side surface 4303 of FIG. 5) surrounding the inner space (e.g., inner space 4304 of FIG. 5) between the first surface and the second surface, and the light absorbing layer may be formed from the first surface and the second surface and/or the lens side surface into the inner space in the second area.

According to various embodiments, the light absorbing layer may be formed to be filled from a part of the first surface to the second surface through the inner space in the second area.

According to various embodiments, the light absorbing layer may be formed to be cut off at least once on the first surface, the second surface, and/or the lens side surface in the second area.

According to various embodiments, the light absorbing layer may be formed with different inner diameters on the first surface and the second surface.

According to various embodiments, the at least one lens may be determined as at least one lens including the second area being reached by the external light being incident with an angle larger than a viewing angle of the plurality of lenses.

According to various embodiments, the at least one lens may be formed so that a minimum length from the first area to an end portion of the lens including the second area does not exceed 0.7 mm.

According to various embodiments, the at least one lens may be formed so that a ratio of a maximum outer diameter of the at least one lens to the minimum length does not exceed 0.3.

According to various embodiments, the penetration depth of the light absorbing layer may be equal to or larger than 200 nm.

According to various embodiments, the penetration depth of the light absorbing layer may be in a range of 240 nm to 250 nm.

According to various embodiments, an electronic device (e.g., mobile electronic device 100 of FIG. 1) may include a housing (e.g., housing 110 of FIG. 1), and a camera module (e.g., camera module 400 of FIG. 4) disposed in an inner space (e.g., inner space 3001 of FIG. 4) of the housing, wherein the camera module includes an image sensor (e.g., image sensor 440 of FIG. 4), and at least one lens (e.g., lens 431 of FIG. 5) including a first area (e.g., first area A1 of FIG. 5) formed to pass at least a part of an external light of the electronic device to the image sensor and a second area (e.g., second area A2 of FIG. 5) disposed to surround the first area at least partly, and wherein the at least one lens includes a first surface (e.g., first surface 4301 of FIG. 5), a second surface (e.g., second surface 4302 of FIG. 5) directed in an opposite direction to the first surface, a lens side surface (e.g., lens side surface 4303 of FIG. 5) surrounding an inner space (e.g., inner space 4304 of FIG. 5) between the first surface and the second surface, an anti-reflection coating layer (e.g., anti-reflection coating layer 4311 of FIG. 5) formed on the first surface and/or the second surface at least in the first area; and a light absorbing layer (e.g., light absorbing layer 4312 of FIG. 5) formed from the first surface and the second surface to at least a part of the inner space with a predetermined penetration depth in the second area.

According to various embodiments, the at least one lens may be determined as at least one lens including the second area being reached by the external light being incident with an angle larger than a viewing angle of the plurality of lenses.

According to various embodiments, the at least one lens may be formed so that a minimum length from the first area to an end portion of the lens including the second area does not exceed 0.7 mm.

According to various embodiments, the at least one lens may be formed so that a ratio of a maximum outer diameter of the at least one lens to the minimum length does not exceed 0.3.

According to various embodiments, a camera module (e.g., camera module 400 of FIG. 4) may include an image sensor (e.g., image sensor 440 of FIG. 4), and at least one lens (e.g., lens 431 of FIG. 5) including a first area (e.g., first area A1 of FIG. 5) formed to pass at least a part of an external light of an electronic device to the image sensor and a second area (e.g., second area A2 of FIG. 5) disposed to surround the first area at least partly, wherein the at least one lens includes a first surface (e.g., first surface 4301 of FIG. 5), a second surface (e.g., second surface 4302 of FIG. 5) directed in an opposite direction to the first surface; a lens side surface (e.g., lens side surface 4303 of FIG. 5) surrounding an inner space (e.g., inner space 4304 of FIG. 5) between the first surface and the second surface, an anti-reflection coating layer (e.g., anti-reflection coating layer 4311 of FIG. 5) formed on the first surface and/or the second surface at least in the first area, and a light absorbing layer (e.g., light absorbing layer 4312 of FIG. 5) formed from the first surface and the second surface to at least a part of the inner space with a predetermined penetration depth in the second area.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing; and
   a camera disposed in an inner space of the housing, wherein the camera comprises:
   an image sensor, and
   a plurality of lenses aligned with the image sensor, wherein each of the plurality of lenses comprising a first surface, a second surface directed in an opposite direction to the first surface and a lens side surface surrounding a space between the first surface and the second surface, and
   wherein the each of the plurality of lenses comprises:
   a first area formed to transfer at least a part of an external light to the image sensor, and
   a second area including a light absorbing layer formed to absorb the at least a part of the external light and to penetrate from an outer surface of the each of the plurality of lenses into the space, and
   wherein the light absorbing layer is formed via a coloring liquid penetrating from the outer surface of the each of the plurality of lenses into the space, and
   wherein the light absorbing layer is formed from the first surface, the second surface and the lens side surface into at least a part of the space in the second area.

2. The electronic device of claim 1, further comprising:
   an anti-reflection coating layer formed in at least a part of the first area.

3. The electronic device of claim 2, wherein the anti-reflection coating layer extends to a part of the second area.

4. The electronic device of claim 2, wherein the anti-reflection coating layer is formed in a circle, a rectangle, or a shape corresponding to a shape of the image sensor through the light absorbing layer when the each of the plurality of lenses is viewed from above.

5. The electronic device of claim 1, wherein the second area is formed to surround at least a part of the first area.

6. The electronic device of claim 1,
   wherein the light absorbing layer is formed in a manner that a colored dye penetrates into an inside of the second area of the each of the plurality of lenses,
   wherein the each of the plurality of lenses being formed of a polymer material, and
   wherein the colored dye penetrating with a predetermined depth through dipping or immersion.

7. The electronic device of claim 1, wherein the light absorbing layer is formed to be filled from a part of the first surface to the second surface through the inner space in the second area.

8. The electronic device of claim 1, wherein the light absorbing layer is formed to be cut off at least once on the first surface, the second surface, and/or the lens side surface in the second area.

9. The electronic device of claim 1, wherein the light absorbing layer is formed with different inner diameters on the first surface and the second surface.

10. The electronic device of claim 1, wherein the each of the plurality of lenses is determined as a lens including the second area being reached by the external light being incident with an angle larger than a viewing angle of the plurality of lenses.

11. The electronic device of claim 1, wherein the each of the plurality of lenses is formed so that a minimum length from the first area to an end portion of the each of the plurality of lenses including the second area does not exceed 0.7 mm.

12. The electronic device of claim 11, wherein the each of the plurality of lenses is formed so that a ratio of a maximum outer diameter of the each of the plurality of lenses to the minimum length does not exceed 0.3.

13. The electronic device of claim 1, wherein a penetration depth of the light absorbing layer is equal to or larger than 200 nm.

14. The electronic device of claim 13, wherein the penetration depth of the light absorbing layer is in a range of 240 nm to 250 nm.

15. An electronic device comprising:
    a housing; and
    a camera disposed in an inner space of the housing, wherein the camera comprises:
    an image sensor, and
    at least one lens including a first area formed to pass at least a part of an external light of the electronic device to the image sensor and a second area disposed to surround the first area at least partly,
    wherein the at least one lens comprises:
    a first surface,
    a second surface directed in an opposite direction to the first surface,
    a lens side surface surrounding a space between the first surface and the second surface,
    an anti-reflection coating layer formed on the first surface and the second surface at least in the first area, and
    a light absorbing layer formed from the first surface, the second surface and the lens side surface to at least a part of the space in the second area, and
    wherein the light absorbing layer is formed via a coloring liquid penetrating from the first surfaces, the second surface and the lens side surface of the at least one lens into the at least a part of the space.

16. The electronic device of claim 15, wherein the at least one lens is determined as at least one lens including the second area being reached by the external light being incident with an angle larger than a viewing angle of the camera.

17. The electronic device of claim 15, wherein the at least one lens is formed so that a minimum length from the first area to an end portion of the lens including the second area does not exceed 0.7 mm.

18. The electronic device of claim 17, wherein the at least one lens is formed so that a ratio of a maximum outer diameter of the at least one lens to the minimum length does not exceed 0.3.

19. A camera comprising:

an image sensor; and at least one lens including a first area formed to pass at least a part of an external light of an electronic device to the image sensor and a second area disposed to surround the first area at least partly, wherein the at least one lens comprises:
  a first surface,
  a second surface directed in an opposite direction to the first surface,
  a lens side surface surrounding an inner space between the first surface and the second surface,
  an anti-reflection coating layer formed on the first surface and/or the second surface at least in the first area, and
  a light absorbing layer formed from the first surface and the second surface to at least a part of the inner space in the second area, and
wherein the light absorbing layer is formed via a coloring liquid penetrating from the first surface and the second surface of the at least one lens the at least a part of the inner space, and
wherein the light absorbing layer is alternatingly spaced between the anti-reflection coating layer.

20. The camera of claim 19, wherein the light absorbing layer is formed to be cut off at least once on the second area by removing a part of the anti-reflection coating layer.

\* \* \* \* \*